(12) United States Patent
Kunz et al.

(10) Patent No.: US 7,455,891 B2
(45) Date of Patent: *Nov. 25, 2008

(54) PROCESS FOR THE PRODUCTION OF STRONGLY ADHERENT COATINGS

(75) Inventors: Martin Kunz, Efringen-Kirchen (DE); Michael Bauer, Merzhausen (DE); Andreas Baranyai, Heitersheim (DE); Giorgio Macor, Sasso Marconi (IT)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/502,208

(22) PCT Filed: Jan. 27, 2003

(86) PCT No.: PCT/EP03/00780

§ 371 (c)(1),
(2), (4) Date: Feb. 9, 2005

(87) PCT Pub. No.: WO03/064061

PCT Pub. Date: Aug. 7, 2003

(65) Prior Publication Data

US 2005/0147919 A1     Jul. 7, 2005

(30) Foreign Application Priority Data

Jan. 29, 2002  (DE) .................... 102 03 245

(51) Int. Cl.
*B05D 3/06* (2006.01)
*B05D 3/08* (2006.01)

(52) U.S. Cl. ............... 427/553; 427/533; 427/223; 427/384; 427/407.1; 427/412.1

(58) Field of Classification Search .............. 427/508
See application file for complete search history.

(56) References Cited

U.S. PATENT DOCUMENTS

| 4,199,421 A | 4/1980 | Kamada et al. ......... 204/159.22 |
| 4,246,315 A | 1/1981 | Kopp et al. ................ 428/315 |
| 4,466,993 A | 8/1984 | Hsu et al. ..................... 427/44 |
| 4,990,364 A | 2/1991 | Bolte et al. .................... 427/44 |
| 5,252,403 A | 10/1993 | Blum et al. .................. 428/447 |
| 6,099,122 A | 8/2000 | Chabrecek et al. .......... 351/160 |
| 6,548,121 B1 * | 4/2003 | Bauer et al. ................. 427/509 |
| 6,733,847 B2 * | 5/2004 | Kunz et al. .................. 427/533 |

FOREIGN PATENT DOCUMENTS

| DE | 3135115 | 3/1983 |
| DE | 19907957 | 9/1999 |
| GB | 2000788 | 1/1979 |
| WO | 00/24527 | 5/2000 |
| WO | WO 00/24527 A1 * | 5/2000 |
| WO | 01/58971 | 8/2001 |
| WO | WO 01/58971 A2 * | 8/2001 |

OTHER PUBLICATIONS

C.-C. Wang et al., Journal of Polymer Science: Part A: Polymer Chemistry, vol. 31, pp. 1307-1314, (1993).
A. T. Bell, Chapter 1, Fundamentals of Plasma Chemistry, pp. 1-55, (1974).
H. Suhr, Plasma Chemistry and Plasma Processing, vol. 3, No. 1, (1983), pp. 1-16.
H. Biedermann et al., Plasma Polymerization Process; Plasma Techology 3; Elsevier, Amsterdam; (1992).
H.-J. Jacobasch et al., Farbe + Lack, 99(7), pp. 602-607, (1993).
J. F. Friedrich et al., Surface and Coatings Technology, vol. 59, (1993), pp. 371-378.
Derwent Abstr. 1999-509829/43 for DE 19907957 (1999).
Derwent Abstr. 29852 K/13 for DE 3135115 (1983).

* cited by examiner

*Primary Examiner*—William Phillip Fletcher, III
(74) *Attorney, Agent, or Firm*—Joseph C. Suhadolnik

(57) ABSTRACT

A process for the production of strongly adherent coatings on an inorganic or organic substrate is provided, wherein in a first step a) a low temperature plasma, a corona discharge or a flame is caused to act on the inorganic or organic substrate, in a second step b) one or more photoinitiators or mixtures of photoinitiators with monomers, containing at least one ethylenically unsaturated group, or solutions, suspensions or emulsions of the afore-mentioned substances, are applied at normal pressure to the inorganic or organic substrate, in a third step c) using suitable methods those afore-mentioned substances are dried and irradiated with electromagnetic waves and, optionally, in a fourth step d1) the substrate so pretreated is provided with a coating and the coating is cured or dried.

17 Claims, No Drawings

PROCESS FOR THE PRODUCTION OF STRONGLY ADHERENT COATINGS

BACKGROUND OF THE INVENTION (1) Field of the Invention

The invention relates to a process for the production of strongly adhering coatings on inorganic or organic substrates, wherein a low-temperature plasma treatment, a corona discharge treatment or a flame treatment is carried out on the inorganic or organic substrate, one or more photoinitiators are applied at normal pressure to the inorganic or organic substrate, and the substrate so precoated with photoinitiator is coated with a composition comprising at least one ethylenically unsaturated monomer or oligomer and the coating is cured by means of radiation. The invention relates also to an apparatus for carrying out the process, to the use of photoinitiators in the production of such layers and to the strongly adherent coatings themselves.

(2) Description of Related Art

The adhesion properties of coatings (e.g. finishes, paints, printing inks or adhesives) on inorganic or organic substrates, especially on non-polar substrates such as polyethylene, polypropylene or fluorine-containing polyolefins, are frequently inadequate. For that reason additional treatments have to be carried out in order to achieve satisfactory results. The adhesion can be improved by first applying special priming coatings, so-called primers, and only then applying the desired coating thereto.

A further possibility lies in exposing the substrates to be coated to a plasma treatment or corona treatment and then coating them, it being possible for a grafting process with e.g. acrylate monomers to be carried out between those two operations (J. Polym. Sci., Part A: Polym. Chem. 31, 1307-1314 (1993)).

The production of low-temperature plasmas and the plasma-assisted deposition of thin organic or inorganic layers, both under vacuum conditions and under normal pressure, have been known for some time. Fundamental principles and applications are described, for example, by A. T. Bell, "Fundamentals of Plasma Chemistry" in "Technology and Application of Plasma Chemistry", edited by J. R. Holahan and A. T. Bell, Wiley, New York (1974) and H. Suhr, Plasma Chem. Plasma Process 3(1), 1, (1983).

It is also possible in plasmas to carry out polymerisations that result in the deposition of polymeric layers and can be used as primers. Fundamental principles and applications are described, for example, by H. Biederman, Y. Osada "Plasma Polymerization Processes" in "Plasma technology 3" edited by L. Holland, Elsevier, Amsterdam 1992.

It is also known that plastics surfaces can be subjected to a plasma treatment and as a result the subsequently applied finish exhibits improved adhesion to the plastics substrate. This is described by H. J. Jacobasch et al. in Farbe+Lack 99 (7), 602-607 (1993) for low-temperature plasmas under vacuum conditions and by J. Friedrich et al. in Surf. Coat. Technol. 59, 371-6 (1993) for plasmas ranging from in vacuo up to normal pressure conditions, the low-temperature plasma changing into a corona discharge.

A process similar to the kind mentioned at the beginning is known from WO 00/24527. That process describes the plasma treatment of substrates with immediate vapour-deposition and grafting-on of photoinitiators in vacua. A disadvantage, however, is that vapour-deposition requires the use of vacuum apparatus and, because of low deposition rates, Is not very efficient and is not suitable for industrial applications having high throughput rates.

There is a need in the art for processes for the pretreatment of substrates that can readily be carried out in practice and are not too expensive in terms of apparatus by means of which the subsequent coating of those substrates is improved.

SUMMARY OF THE INVENTION

It has now been found that coatings of photocurable compositions having especially good adhesion can be obtained by applying a photoinitiator to a substrate to be coated, after that substrate has been subjected to a plasma treatment (low pressure and/or normal pressure plasmas), corona treatment or flame treatment, and drying and/or irradiating the substrate so treated. The substrates so pretreated are provided with a coating and cured. The resulting coatings exhibit surprisingly good adhesion which does not suffer any appreciable deterioration even after several days' storage or exposure to sunlight.

DETAILED DESCRIPTION OF THE INVENTION

The invention therefore relates to a process for the production of strongly adherent coatings on an inorganic or organic substrate, wherein a) a low-temperature plasma treatment, a corona discharge treatment or a flame treatment is carried out on the inorganic or organic substrate, b) one or more photoinitiators or mixtures of photoinitiators with monomers or/and oligomers, containing at least one ethylenically unsaturated group, or solutions, suspensions or emulsions of the afore-mentioned substances, are applied at normal pressure to the inorganic or organic substrate, and c) using suitable methods those afore-mentioned substances are optionally dried and/or are irradiated with electromagnetic waves.

The process is simple to carry out and allows a high throughput per unit of time, since lengthy application steps and slow crosslinking reactions are not required. The process is especially well suited to workpieces that are composed of different plastics and/or metals or types of glass and that without the pretreatment would therefore exhibit different degrees of adhesion on the different components or that in the case of a conventional primer treatment exhibit different affinities for the primer.

In the process according to the invention, after the photoiniator or photoinitiators, or a solution or dispersion thereof in a solvent or monomer, has or have been applied to the substrate which has been plasma-, corona- or flame-pretreated and after any drying step for evaporating off any solvent used, a fixing step for the photoinitiator is carried out by exposure to UV/VIS light. In the context of the present Application, the term "drying" includes both variants, both the removal of the solvent and the fixing of the photoinitiator.

Of interest, therefore, is a process for the production of strongly adherent coatings on inorganic or organic substrates, wherein a) a low-temperature plasma treatment, a corona discharge treatment or a flame treatment is carried out on the inorganic or organic substrate, b) one or more photoinitiators or mixtures of photoinitiators with monomers or/and oligomers, containing at least one ethylenically unsaturated group, or solutions, suspensions or emulsions of the afore-mentioned substances, are applied at normal pressure to the inorganic or organic substrate, and c) using suitable methods those afore-mentioned substances are optionally dried and are irradiated with electromagnetic waves to fix the photoinitiator.

In step c) of the above-described preferred processes, the drying, that is to say the removal of the solvent, is optional. That step can be omitted, for example, when no solvent was used. The fixing of the photoinitiator in step c) of the preferred processes by irradiation with electromagnetic waves, especially UV/VIS radiation, must be carried out.

Suitable apparatus for drying and irradiation are described hereinbelow.

The invention relates also to a process for the production of strongly adherent coatings on an inorganic or organic substrate, wherein a) a low-temperature plasma treatment, a corona discharge treatment or a flame treatment is carried out on the inorganic or organic substrate, b) one or more photoinitiators or mixtures of photoinitiators with monomers or/and oligomers, containing at least one ethylenically unsaturated group, or solutions, suspensions or emulsions of the afore-mentioned substances, are applied to the inorganic or organic substrate, c) using suitable methods those afore-mentioned substances are dried and/or irradiated with electromagnetic waves and either d1) the substrate so precoated with photoinitiator is coated with a composition comprising at least one ethylenically unsaturated monomer or oligomer, and the coating is cured by means of UV/VIS radiation or an electron beam; or d2) the substrate so precoated with photoinitiator is provided with a coating and dried.

Preference is given to a process for the production of strongly adherent coatings on an inorganic or organic substrate, wherein a) a low-temperature plasma treatment, a corona discharge treatment or a flame treatment is carried out on the inorganic or organic substrate, b) one or more photoinitiators or mixtures of photoinitiators with monomers or/and oligomers, containing at least one ethylenically unsaturated group, or solutions, suspensions or emulsions of the afore-mentioned substances, are applied to the inorganic or organic substrate, c) using suitable methods those afore-mentioned substances are optionally dried and are irradiated with electromagnetic waves to fix the photoiniator and either d1) the substrate so precoated with photoinitiator is coated with a composition comprising at least one ethylenically unsaturated monomer or oligomer, and the coating is cured by means of UV/VIS radiation or an electron beam; or d2) the substrate so precoated with photoinitiator is provided with a coating and dried.

Process step b) in each of the above-described processes is preferably carried out under normal pressure.

If, in process step b) (in each of the above-described processes), mixtures of photoinitiators with monomers or/and oligomers are used, the use of mixtures of one or more photoinitiators with monomers is preferred.

Possible ways of obtaining plasmas under vacuum conditions have been described frequently in the literature. The electrical energy can be coupled in by inductive or capacitive means. It may be direct current or alternating current; the frequency of the alternating current may range from a few kHz up into the MHz range. A power supply in the microwave range (GHz) is also possible.

The principles of plasma production and maintenance are described, for example, in the review articles by A. T. Bell and H. Suhr mentioned above.

As primary plasma gases it is possible to use, for example, He, argon, xenon, $N_2$, $O_2$, $H_2$, steam or air.

The process according to the invention is not sensitive per se in respect of the coupling-in of the electrical energy.

The process can be carried out batchwise, for example in a rotating drum, or continuously in the case of films, fibres or woven fabrics. Such methods are known and are described in the prior art.

The process can also be carried out under corona discharge conditions. Corona discharges are produced under normal pressure conditions, the ionised gas used being most frequently air. In principle, however, other gases and mixtures are also possible, as described, for example, in COATING Vol. 2001, No. 12, 426, (2001). The advantage of air as ionisation gas in corona discharges is that the operation can be carried out in an apparatus open to the outside and, for example, a film can be drawn through continuously between the discharge electrodes. Such process arrangements are known and are described, for example, in J. Adhesion Sci. Technol. Vol 7, No. 10, 1105, (1993). Three-dimensional workpieces can be treated with a plasma jet, the contours being followed with the assistance of robots.

The flame treatment of substrates is known to the person skilled in the art. Corresponding industrial apparatus, for example for the flame treatment of films, is commercially available. In such a treatment, a film is conveyed on a cooled cylindrical roller past the flame-treatment apparatus, which consists of a chain of burners arranged in parallel, usually along the entire length of the cylindrical roller. Details can be found in the brochures of the manufacturers of flame-treatment apparatus (e.g. esse CI, flame treaters, Italy). The parameters to be chosen are governed by the particular substrate to be treated. For example, the flame temperatures, the flame intensity, the dwell times, the distance between substrate and burner, the nature of the combustion gas, air pressure, humidity, are matched to the substrate in question. As flame gases it is possible to use, for example, methane, propane, butane or a mixture of 70% butane and 30% propane.

The inorganic or organic substrate to be treated can be in any solid form. The substrate is preferably in the form of a woven fabric, a fibre, a film or a three-dimensional workpiece. The substrate may be, for example, a thermoplastic, elastomeric, inherently crosslinked or cross-linked polymer, a metal oxide, a ceramic material, glass, metal, leather or textile.

The pretreatment of the substrate in the form of plasma-, corona- or flame-treatment can be carried out, for example, immediately after the extrusion of a fibre or film, and also directly after film-drawing.

The inorganic or organic substrate is preferably a thermoplastic, elastomeric, inherently crosslinked or crosslinked polymer, a metal oxide, a ceramic material, a glass or a metal, especially a thermoplastic, elastomeric, inherently crosslinked or crosslinked polymer.

Examples of thermoplastic, elastomeric, inherently crosslinked or crosslinked polymers are listed below.

1. Polymers of mono- and di-olefins, for example polypropylene, polyisobutylene, polybutene-1, poly-4-methylpentene-1, polyisoprene or polybutadiene and also polymerisates of cyclo-olefins, for example of cyclopentene or norbornene; and also polyethylene (which may optionally be crosslinked), for example high density polyethylene (HDPE), high density polyethylene of high molecular weight (HDPE-HMW), high density polyethylene of ultra-high molecular weight (HDPE-UHMW), medium density polyethylene (MDPE), low density polyethylene (LDPE), and linear low density polyethylene (LLDPE), (VLDPE)

and (ULDPE). Polyolefins, that is to say polymers of mono-olefins, as mentioned by way of example in the preceding paragraph, especially polyethylene and polypropylene, can be prepared by various processes, especially by the following methods:

a) by free radical polymerisation (usually at high pressure and high temperature);

b) by means of a catalyst, the catalyst usually containing one or more metals of group IVb, Vb, VIb or VIII. Those metals generally have one or more ligands, such as oxides, halides, alcoholates, esters, ethers, amines, alkyls, alkenyls and/or aryls, which may be either π- or σ-coordinated. Such metal complexes may be free or fixed to carriers, for example to activated magnesium chloride, titanium(III) chloride, aluminium oxide or silicon oxide. Such catalysts may be soluble or insoluble in the polymerisation medium. The catalysts can be active as such in the polymerisation or further activators may be used, for example metal alkyls, metal hydrides, metal alkyl halides, metal alkyl oxides or metal alkyl oxanes, the metals being elements of group(s) Ia, IIa and/or IIIa. The activators may have been modified, for example, with further ester, ether, amine or silyl ether groups. Such catalyst systems are usually referred to as Phillips, Standard Oil Indiana, Ziegler (-Natta), TNZ (DuPont), metallocene or Single Site Catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of mono- and di-olefins with one another or with other vinyl monomers, for example ethylene/propylene copolymers, linear low density polyethylene (LLDPE) and mixtures thereof with low density polyethylene (LDPE), propylene/butene-1 copolymers, propylene/isobutylene copolymers, ethylene/butene-1 copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and copolymers thereof with carbon monoxide, or ethylene/acrylic acid copolymers and salts thereof (ionomers), and also terpolymers of ethylene with propylene and a diene, such as hexadiene, dicyclopentadiene or ethylidenenorbornene; and also mixtures of such copolymers with one another or with polymers mentioned under 1), for example polypropylene-ethylene/propylene copolymers, LDPE-ethylene/vinyl acetate copolymers, LDPE-ethylene/acrylic acid copolymers, LLDPE-ethylene/vinyl acetate copolymers, LLDPE-ethylene/acrylic acid copolymers and alternately or randomly structured polyalkylene-carbon monoxide copolymers and mixtures thereof with other polymers, for example polyamides.

4. Hydrocarbon resins (for example $C_5$-$C_9$) including hydrogenated modifications thereof (for example tackifier resins) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate and methacrylate, styrene/maleic anhydride, styrene/acrylonitrile/methyl acrylate; high-impact-strength mixtures consisting of styrene copolymers and another polymer, for example a polyacrylate, a diene polymer or an ethylene/propylene/diene terpolymer; and also block copolymers of styrene, for example styrene/butadiene/styrene, styrene/isoprene/styrene, styrene/ethylene-butylene/styrene or styrene/ethylene-propylene/styrene.

7. Graft copolymers of styrene or α-methylstyrene, for example styrene on polybutadiene, styrene on polybutadiene/styrene or polybutadiene/acrylonitrile copolymers, styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleic acid imide on polybutadiene; styrene and maleic acid imide on polybutadiene, styrene and alkyl acrylates or alkyl methacrylates on polybutadiene, styrene and acrylonitrile on ethylene/propylene/diene terpolymers, styrene and acrylonitrile on polyalkyl acrylates or polyalkyl methacrylates, styrene and acrylonitrile on acrylate/butadiene copolymers, and mixtures thereof with the copolymers mentioned under 6), such as those known, for example, as so-called ABS, MBS, ASA or AES polymers.

8. Halogen-containing polymers, for example polychloroprene, chlorinated rubber, chlorinated and brominated copolymer of isobutylene/isoprene (halobutyl rubber), chlorinated or chlorosulfonated polyethylene, copolymers of ethylene and chlorinated ethylene, epichlorohydrin homo- and co-polymers, especially polymers of halogen-containing vinyl compounds, for example polyvinyl chloride, polyvinylidene chloride, polyvinyl fluoride, polyvinylidene fluoride; and copolymers thereof, such as vinyl chloride/vinylidene chloride, vinyl chloride/vinyl acetate or vinylidene chloride/vinyl acetate.

9. Polymers derived from α,β-unsaturated acids and derivatives thereof, such as polyacrylates and polymethacrylates, or polymethyl methacrylates, polyacrylamides and polyacrylonitriles impact-resistant-modified with butyl acrylate.

10. Copolymers of the monomers mentioned under 9) with one another or with other unsaturated monomers, for example acrylonitrile/butadiene copolymers, acrylonitrile/alkyl acrylate copolymers, acrylonitrile/alkoxyalkyl acrylate copolymers, acrylonitrile/vinyl halide copolymers or acrylonitrile/alkyl methacrylate/butadiene terpolymers.

11. Polymers derived from unsaturated alcohols and amines or their acyl derivatives or acetals, such as polyvinyl alcohol, polyvinyl acetate, stearate, benzoate or maleate, polyvinylbutyral, polyallyl phthalate, polyallylmelamine; and the copolymers thereof with olefins mentioned in Point 1.

12. Homo- and co-polymers of cyclic ethers, such as polyalkylene glycols, polyethylene oxide, polypropylene oxide or copolymers thereof with bisglycidyl ethers.

13. Polyacetals, such as polyoxymethylene, and also those polyoxymethylenes which contain comonomers, for example ethylene oxide; polyacetals modified with thermoplastic polyurethanes, acrylates or MBS.

14. Polyphenylene oxides and sulfides and mixtures thereof with styrene polymers or polyamides.

15. Polyurethanes derived from polyethers, polyesters and polybutadienes having terminal hydroxyl groups on the one hand and aliphatic or aromatic polyisocyanates on the other hand, and their initial products.

16. Polyamides and copolyamides derived from diamines and dicarboxylic acids and/or from aminocarboxylic acids or the corresponding lactams, such as polyamide 4, polyamide 6, polyamide 6/6, 6/10, 6/9, 6/12, 4/6, 12/12, polyamide 11, polyamide 12, aromatic polyamides derived from m-xylene, diamine and adipic acid; polyamides prepared from hexamethylenediamine and iso- and/or tere-phthalic acid and optionally an elastomer as modifier, for example poly-2,4,4-trimethylhexamethylene terephthalamide or poly-m-phenylene isophthalamide. Block copolymers of the above-mentioned polyamides with polyolefins, olefin copolymers, ionomers or chemically bonded or grafted elastomers; or with polyethers, for example with polyethylene glycol, polypropylene glycol or polytetramethylene glycol. Also polyamides or copolyamides modified with EPDM or ABS; and polyamides condensed during processing ("RIM polyamide systems").

17. Polyureas, polyimides, polyamide imides, polyether imides, polyester imides, polyhydantoins and polybenzimidazoles.
18. Polyesters derived from dicarboxylic acids and dialcohols and/or from hydroxycarboxylic acids or the corresponding lactones, such as polyethylene terephthalate, polybutylene terephthalate, poly-1,4-dimethylolcyclohexane terephthalate, polyhydroxybenzoates, and also block polyether esters derived from polyethers with hydroxyl terminal groups; and also polyesters modified with polycarbonates or MBS.
19. Polycarbonates and polyester carbonates.
20. Polysulfones, polyether sulfones and polyether ketones.
21. Crosslinked polymers derived from aldehydes on the one hand and phenols, urea or melamine on the other hand, such as phenol-formaldehyde, urea-formaldehyde and melamine-formaldehyde resins.
22. Drying and non-drying alkyd resins.
23. Unsaturated polyester resins derived from copolyesters of saturated and unsaturated dicarboxylic acids with polyhydric alcohols, and also vinyl compounds as crosslinking agents, and also the halogen-containing, difficultly combustible modifications thereof.
24. Crosslinkable acrylic resins derived from substituted acrylic esters, e.g. from epoxy acrylates, urethane acrylates or polyester acrylates.
25. Alkyd resins, polyester resins and acrylate resins that are crosslinked with melamine resins, urea resins, isocyanates, isocyanurates, polyisocyanates or epoxy resins.
26. Crosslinked epoxy resins derived from aliphatic, cycloaliphatic, heterocyclic or aromatic glycidyl compounds, e.g. products of bisphenol-A diglycidyl ethers, bisphenol-F diglycidyl ethers, that are crosslinked using customary hardeners, e.g. anhydrides or amines with or without accelerators.
27. Natural polymers, such as cellulose, natural rubber, gelatin, or polymer-homologously chemically modified derivatives thereof, such as cellulose acetates, propionates and butyrates, and the cellulose ethers, such as methyl cellulose; and also colophonium resins and derivatives.
28. Mixtures (polyblends) of the afore-mentioned polymers, for example PP/EPDM, polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

The substrate can for example be one as used in the commercial printing area, sheet-fat- or web-printing, posters, calendars, forms, labels, wrapping foils, tapes, credit cards, furniture profiles, etc. The substrate is not restricted to the use in the non-food area. The substrate may also be, for example, a material for use in the field of nutrition, e.g. as packaging for foodstuffs; cosmetics, medicaments, etc.

Where substrates have been pretreated according to processes of the invention it is also possible, for example, for substrates that usually have poor compatibility with one another to be adhesively bonded to one another or laminated.

Within the context of the present invention, paper should also be understood as being an inherently crosslinked polymer, especially in the form of cardboard, which can additionally be coated with e.g. Teflon®. Such substrates are, for example, commercially available.

The thermoplastic, crosslinked or inherently crosslinked plastics is preferably a polyolefin, polyamide, polyacrylate, polycarbonate, polystyrene or an acrylic/melamine, alkyd or polyurethane surface-coating.

Polycarbonate, polyethylene and polypropylene are especially preferred.

The plastics may be, for example, in the form of films, injection-moulded articles, extruded workpieces, fibres, felts or woven fabrics.

As inorganic substrates there come into consideration especially glass, ceramic materials, metal oxides and metals. They may be silicates and semi-metal or metal oxide glasses which are preferably in the form of layers or in the form of powders preferably having average particle diameters of from 10 nm to 2000 µm. The particles may be dense or porous. Examples of oxides and silicates are $SiO_2$, $TiO_2$, $ZrO_2$, MgO, NiO, $WO_3$, $Al_2O_3$, $La_2O_3$, silica gels, clays and zeolites. Preferred inorganic substrates, in addition to metals, are silica gels, aluminium oxide, titanium oxide and glass and mixtures thereof.

As metal substrates there come into consideration especially Fe, Al, Ti, Ni, Mo, Cr and steel alloys.

Photoinitiators suitable for use in the process according to the invention are in principle any compounds and mixtures that form one or more free radicals when irradiated with electromagnetic waves. These include initiator systems consisting of a plurality of initiators and systems that function independently of one another or synergistically. In addition to coinitiators, for example amines, thiols, borates, enolates, phosphines, carboxylates and imidazoles, it is also possible to use sensitisers, for example acridines, xanthenes, thiazenes, coumarins, thioxanthones, triazines and dyes. A description of such compounds and initiator systems can be found e.g. in Crivello J. V., Dietliker K. K., (1999): Chemistry & Technology of UV & EB Formulation for Coatings, Inks & Paints, and in Bradley G. (ed.) Vol. 3: Photoinitiators for Free Radical and Cationic Polymerisation 2nd Edition, John Wiley & Son Ltd. The photoinitiator suitable for the process according to the invention in step b) may be either an initiator having an unsaturated group or an initiator not having such a group.

Such compounds and derivatives are derived, for example, from the following classes of compounds: benzoins, benzil ketals, acetophenones, hydroxyalkylphenones, aminoalkylphenones, acylphosphine oxides, acylphosphine sulfides, acyloxyiminoketones, alkylamino-substituted ketones, such as Michler's ketone, peroxy compounds, dinitrile compounds, halogenated acetophenones, phenylglyoxylates, dimeric phenylglyoxalates, benzophenones, oximes and oxime esters, thioxanthones, coumarins, ferrocenes, titanocenes, onium salts, sulfonium salts, iodonium salts, diazonium salts, borates, triazines, bisimidazoles, polysilanes and dyes. It is also possible to use combinations of the compounds from the mentioned classes of compounds with one another and combinations with corresponding coinitiator systems and/or sensitisers.

The photoinitiator is preferably a compound of formula I or Ia (RG)-A-(IN) (I), (IN)-A-(RG')-A-(IN) (Ia), wherein (IN) is a photoinitiator base structure;

A is a spacer group or a single bond;

(RG) is hydrogen or at least one functional ethylenically unsaturated group; and (RG') is a single bond or a divalent radical that contains at least one functional ethylenically unsaturated group, or is a trivalent radical.

Of interest are compounds of formula I or Ia wherein (IN) is a photoinitiator base structure of formula (II) or (III)

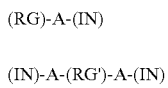
(II)

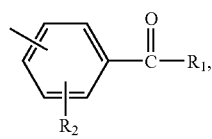
(III)

$R_1$ is a group (A), (B), (C) or (III)

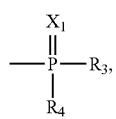
(A)

—$CR_6R_7R_8$ (B)

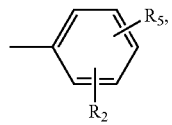
(C)

n is a number from 0 to 6;

$R_2$ is hydrogen, $C_1$-$C_{12}$alkyl, halogen, the group (RG)-A- or, when $R_1$ is a group (A), two radicals $R_2$ in the ortho-position to the carbonyl group may also together be —S— or

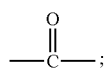
;

$R_3$ and $R_4$ are each independently of the other $C_1$-$C_6$alkyl, $C_1$-$C_6$alkanoyl, phenyl or benzoyl, the radicals phenyl and benzoyl each being unsubstituted or substituted by halogen, $C_1$-$C_6$alkyl, $C_1$-$C_6$alkylthio or by $C_1$-$C_6$alkoxy;

$R_5$ is hydrogen, halogen, $C_1$-$C_{12}$alkyl or $C_1$-$C_{12}$alkoxy or the group (RG)-A-;

$R_6$ is $OR_9$ or $N(R_9)_2$ or is

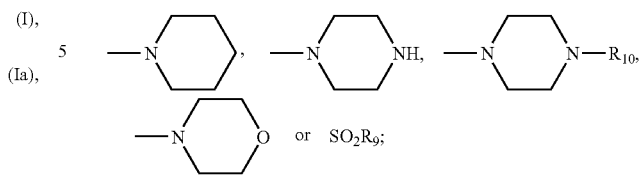

$R_7$ and $R_8$ are each independently of the other hydrogen, $C_1$-$C_{12}$alkyl, $C_2$-$C_{12}$alkenyl, $C_1$-$C_{12}$alkoxy, phenyl or benzyl or $R_7$ and $R_8$ together are $C_2$-$C_6$alkylene;

$R_9$ is hydrogen, $C_1$-$C_6$alkyl or $C_1$-$C_6$alkanoyl;

$R_{10}$ is hydrogen, $C_1$-$C_{12}$alkyl or phenyl;

$R_{11}$ is $C_1$-$C_4$alkyl or

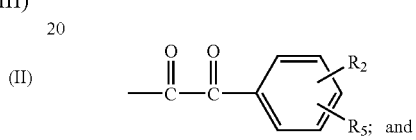

$X_1$ is oxygen or sulfur.

(IN) is, for example, a group

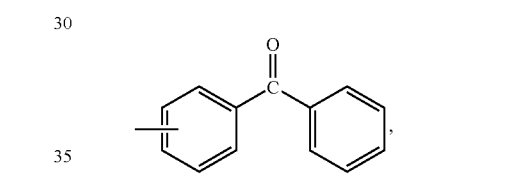

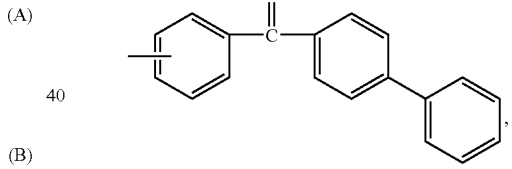

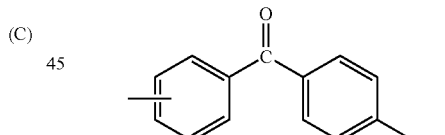

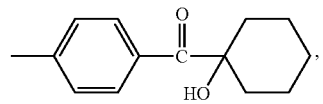

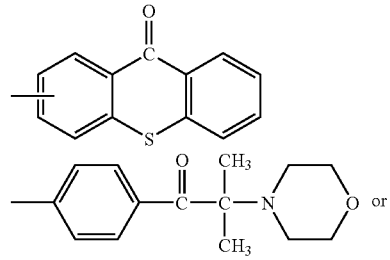

-continued

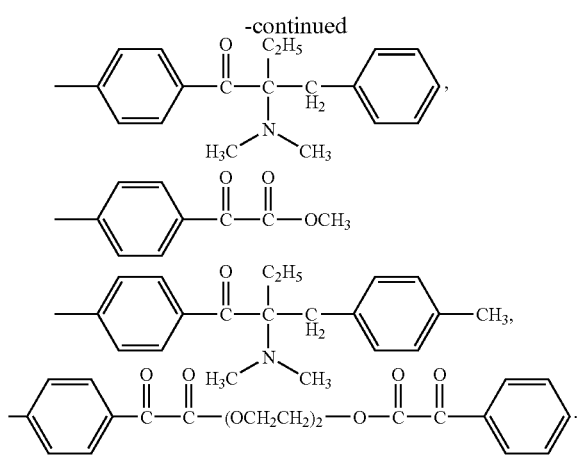

A in the compounds of formula I or Ia is, for example, a single bond, a spacer group

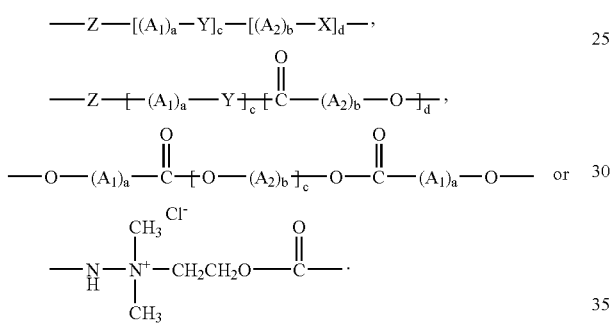

X, Y and Z are each independently of the others a single bond, —O—, —S—, —N($R_{10}$)—, —(CO)—, —(CO)O—, —(CO)N($R_{10}$)—, —O—(CO)—, —N($R_{10}$)—(CO)— or —N($R_{10}$)—(CO)O—.

$A_1$ and $A_2$ are e.g. each independently of the other $C_1$-$C_4$alkylene, $C_3$-$C_{12}$cycloalkylene, phenylene, phenylene-$C_1$-$C_4$alkylene or $C_1$-$C_4$alkylene-phenylene-$C_1$-$C_4$alkylene.

a, b, c and d are each independently of the others a number from 0 to 4.

Special preference is given to compounds of formula I or Ia wherein A is a spacer group $Z[(CH_2)_a$—$Y]_c$—$[(CH_2)_b$—$X]_d$— and X, Y, Z, a, b, c and d are as defined above.

In the compounds of formula I or Ia
(RG) is hydrogen or $R_cR_bC$=$CR_a$—, especially $R_cR_bC$=$CR_a$—;
(RG') is a single bond,

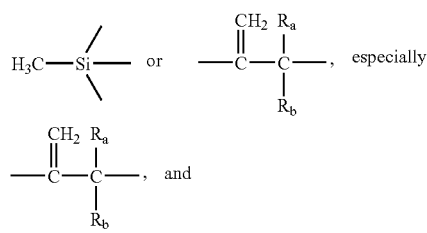

$R_a$, $R_b$, $R_c$ are each H or $C_1$-$C_6$alkyl, especially H or $CH_3$.

The preparation of such photoinitiator compounds is known to the person skilled in the art and has already been described in a large number of publications.

For example, compounds containing unsaturated groups can be prepared by reaction of 4-[2-hydroxyethoxy)-benzoyl]-1-hydroxy-1-methyl-ethane (Irgacure® 2959, Ciba Spezialitätenchemie) with isocyanates containing acryloyl or methacryloyl groups or with other compounds containing acryloyl or methacryloyl groups, see e.g. U.S. Pat. No. 4,922,004.

Commercially available unsaturated photoinitiators are, for example, 4-(13-acryloyl-1,4,7,10,13-pentaoxatridecyl)-benzophenone (Uvecryl P36 from UCB), 4-benzoyl-N,N-dimethyl-N-[2-(1-oxo-2-propenyl)oxy]ethylphenylmethanaminium chloride (Quantacure ABQ from Great Lakes), and some copolymerisable unsaturated tertiary amines (Uvecryl P101, Uvecryl P104, Uvecryl P105, Uvecryl P115 from UCB Radcure Specialties) or copolymerisable aminoacrylates (Photomer 4116 and Photomer 4182 from Ackros; Laromer LR8812 from BASF; CN381 and CN386 from Cray Valley).

The publications indicated below provide further specific examples of suitable photoinitiator compounds having an ethylenically unsaturated function, and the preparation thereof: Unsaturated aceto- and benzo-phenone derivatives are described, for example, in U.S. Pat. Nos. 3,214,492, 3,429,852, 3,622,848 and 4,304,895, for example

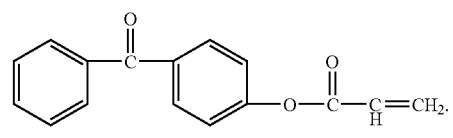

Also suitable, for example, are

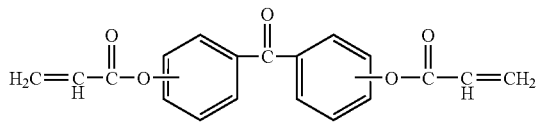

and further copolymerisable benzophenones, e.g. from UCB, Ebecryl P36 or in the form of Ebecryl P38 diluted in 30% tripropylene glycol diacrylate.

Copolymerisable, ethylenically unsaturated acetophenone compounds can be found, for example, in U.S. Pat. No. 4,922,004, for example

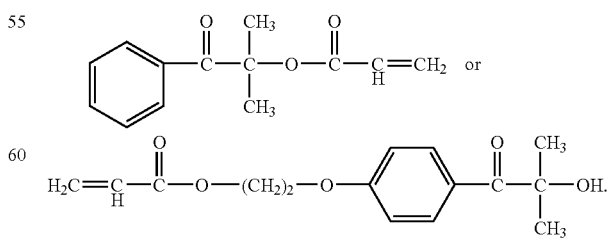

2-Acryloyl-thioxanthone has been published in Eur. Polym. J. 23 985 (1987). Examples such as

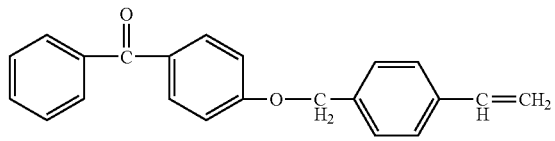

are described in DE 2 818 763. Further unsaturated carbonate-group-containing photoinitiator compounds can be found in EP 377 191. Uvecryl® P36 (already mentioned above), from UCB, is a benzophenone bonded to an acrylic function by ethylene oxide units (see Technical Bulletin 2480/885 (1985) from UCB or New. Polym. Mat. 1, 63 (1987)):

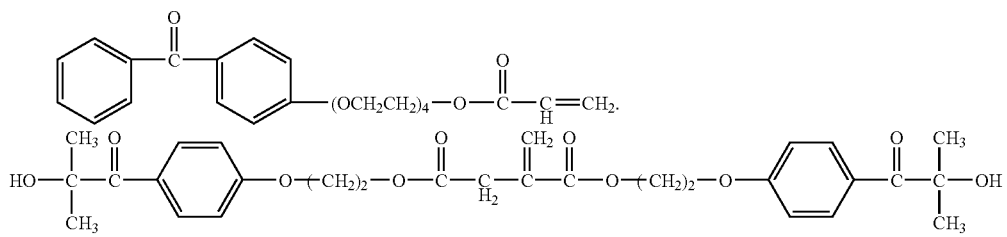

has been published in Chem. Abstr. 128: 283649r.

DE 195 01 025 gives further suitable ethylenically unsaturated photoinitiator compounds. Examples are 4-vinyloxycarbonyloxybenzophenone, 4-vinyloxycarbonyloxy-4'-chlorobenzophenone, 4-vinyloxycarbonyloxy-4'-methoxybenzophenone, N-vinyloxycarbonyl-4-aminobenzophenone, vinyloxycarbonyloxy-4-fluorobenzophenone, 2-vinyloxycarbonyloxy-4'-methoxybenzophenone, 2-vinyloxycarbonyloxy-5-fluoro-4'-chlorobenzophenone, 4-vinyloxycarbonyloxyacetophenone, 2-vinyloxycarbonyloxyacetophenone, N-vinyloxycarbonyl-4-amino-acetophenone, 4-vinyloxycarbonyloxybenzil, 4-vinyloxycarbonyloxy-4'-methoxybenzil, vinyloxycarbonyl-benzoin ether, 4-methoxybenzoinvinyloxycarbonyl ether, phenyl(2-vinyloxycarbonyloxy-2-propyl)-ketone, (4-isopropylphenyl)-(2-vinyloxycarbonyloxy-2-propyl)-ketone, phenyl-(1-vinyloxycarbonyloxy)-cyclohexyl ketone, 2-vinyloxycarbonyloxy-9-fluorenone, 2-(N-vinyloxycarbonyl)-9-aminofluorenone, 2-vinylcarbonyloxymethylanthraquinone, 2-(N-vinyloxycarbonyl)-aminoanthraquinone, 2-vinyloxycarbonyloxythioxanthone, 3-vinylcarbonyloxythioxanthone or

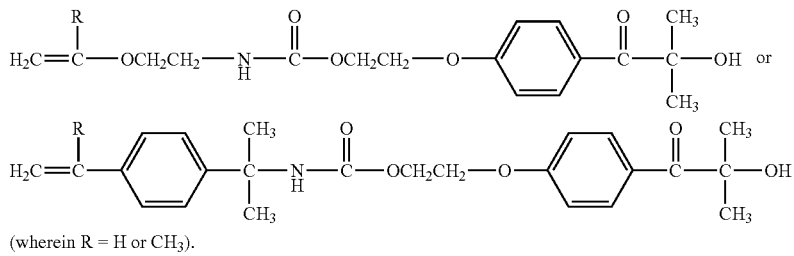

U.S. Pat. No. 4,672,079 discloses inter alia the preparation of 2-hydroxy-2-methyl(4-vinylpropiophenone), 2-hydroxy-2-methyl-p-(1-methylvinyl)propiophenone, p-vinylbenzoyl-cyclohexanol, p-(1-methylvinyl)benzoyl-cyclohexanol.

Also suitable are the reaction products, described in JP Kokai Hei 2-292307, of 4-[2-hydroxyethoxy)-benzoyl]-1-hydroxy-1-methyl-ethane (Irgacure® 2959, Ciba Spezialitätenchemie) and isocyanates containing acryloyl or methacryloyl groups, for example $$H_2C=\overset{R}{C}-OCH_2CH_2-\overset{H}{N}-\overset{O}{C}-OCH_2CH_2-O-\text{(phenyl)}-\overset{O}{C}-\overset{CH_3}{\underset{CH_3}{C}}-OH \text{ or}$$

$$H_2C=\overset{R}{C}-\text{(phenyl)}-\overset{CH_3}{\underset{CH_3}{C}}-\overset{H}{N}-\overset{O}{C}-OCH_2CH_2-O-\text{(phenyl)}-\overset{O}{C}-\overset{CH_3}{\underset{CH_3}{C}}-OH$$

(wherein R = H or CH$_3$).

Further examples of suitable photoinitiators are

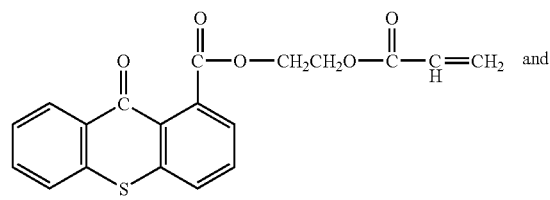 and

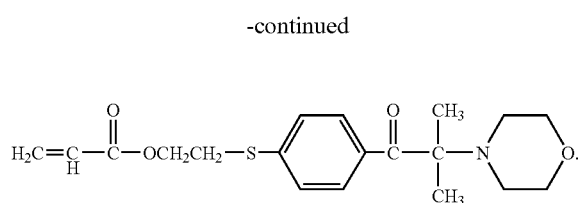

The following examples are described in Radcure '86, Conference Proceedings, 4-43 to 4-54 by W. Bäumer et al.

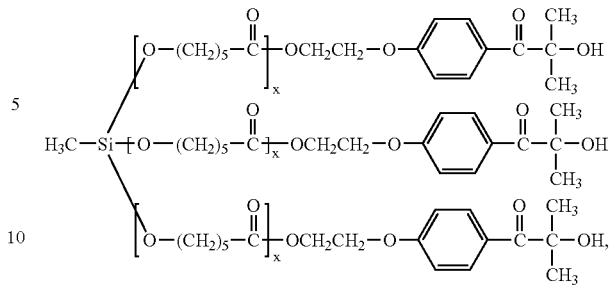

wherein x, y and z are an average of 3 (SiMFPI2) and

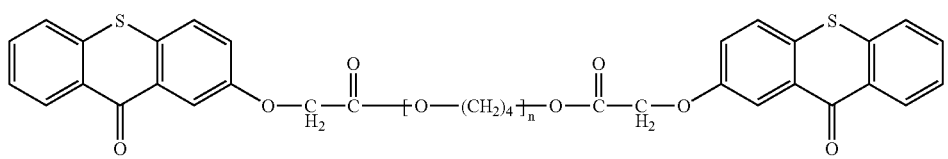

(MFPITX).

In the process according to the invention it is possible to use either saturated or unsaturated photoinitiators. It is preferable to use unsaturated photoinitiators.

In the process according to the invention it is of course also possible to employ mixtures of different photoinitiators, for example mixtures of saturated and unsaturated photoinitiators.

Photoinitiators without an unsaturated group are known to the person skilled in the art and a large number and variety of such photoinitiators are commercially available. In the process there are in principle suitable any photoinitiators that, after plasma-, corona- or flame-treatment, adhere to the surface of the substrate so treated.

The meanings of the substituents defined in formulae I and Ia in the different radicals are explained below.

$C_1$-$C_{12}$Alkyl is linear or branched and is, for example, $C_1$-$C_8$-, $C_1$-$C_6$- or $C_1$-$C_4$-alkyl. Examples are methyl, ethyl, propyl, isopropyl, n-butyl, sec-butyl, isobutyl, tert-butyl, pentyl, hexyl, heptyl, 2,4,4-trimethyl-pentyl, 2-ethylhexyl, octyl, nonyl, decyl, undecyl and dodecyl, especially e.g. methyl or butyl.

$C_1$-$C_6$Alkyl and $C_1$-$C_4$alkyl are likewise linear or branched and have e.g. the above-mentioned meanings up to the appropriate number of carbon atoms. $C_1$-$C_6$Alkyl substituents for benzoyl or phenyl are especially $C_1$-$C_4$alkyl, e.g. methyl or butyl.

Halogen is fluorine, chlorine, bromine and iodine, especially chlorine and bromine, preferably chlorine.

When $R_1$ is a group (A), and two radicals $R_2$ in the ortho-position to the carbonyl group together also are —S— or —(C=O)—, there are obtained, for example, structures having a thioxanthone base structure

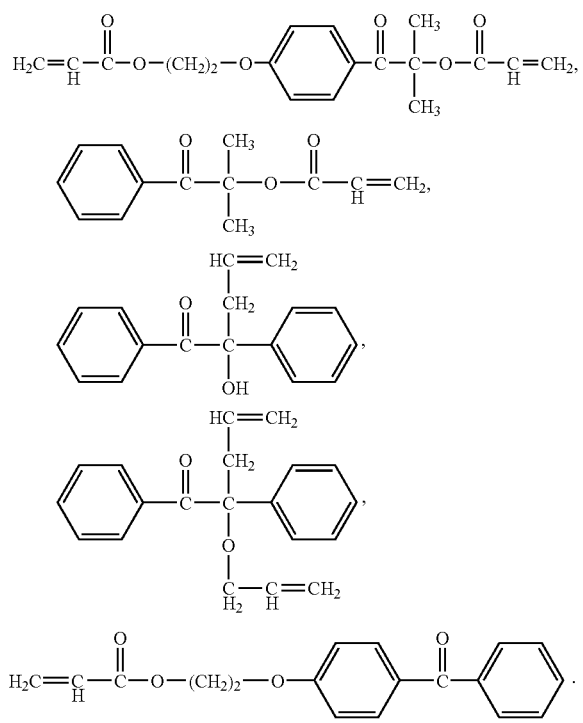

G. Wehner et al. report in Radtech '90 North America on

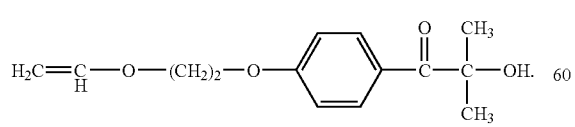

In the process according to the invention there are also suitable the compounds presented at RadTech 2002, North America

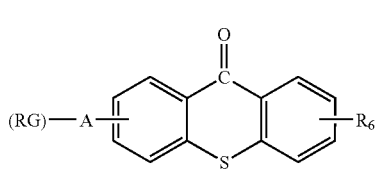

or anthraquinone base structure

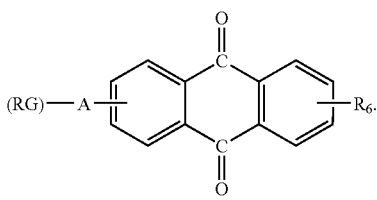

$C_1$-$C_6$Alkanoyl is linear or branched and is, for example, $C_1$-$C_4$alkanoyl. Examples are formyl, acetyl, propionyl, butanoyl, isobutanoyl, pentanoyl and hexanoyl, preferably acetyl. $C_1$-$C_4$Alkanoyl has the above-mentioned meanings up to the appropriate number of carbon atoms.

$C_1$-$Cl_2$Alkoxy denotes linear or branched radicals and is, for example, $C_1$-$C_8$-, $C_1$-$C_6$- or $C_1$-$C_4$-alkoxy. Examples are methoxy, ethoxy, propoxy, isopropoxy, n-butyloxy, sec-butyloxy, isobutyloxy, tert-butyloxy, pentyloxy, hexyloxy, heptyloxy, 2,4,4-trimethylpentyloxy, 2-ethylhexyloxy, octyloxy, nonyloxy, decyloxy and dodecyloxy, especially methoxy, ethoxy, propoxy, isopropoxy, n-butyloxy, sec-butyloxy, isobutyloxy, tert-butyloxy, preferably methoxy. $C_1$-$C_8$Alkoxy, $C_1$-$C_6$alkoxy and $C_1$-$C_4$alkoxy are likewise linear or branched and have e.g. the above-mentioned meanings up to the appropriate number of carbon atoms.

$C_1$-$C_6$Alkylthio denotes linear or branched radicals and is, for example, $C_1$-$C_4$alkylthio. Examples are methylthio, ethylthio, propylthio, isopropylthio, n-butylthio, sec-butylthio, isobutylthio, tert-butylthio, pentylthio and hexylthio, especially methylthio, ethylthio, propylthio, isopropylthio, n-butylthio, sec-butylthio, isobutylthio, tert-butylthio, preferably methylthio. $C_1$-$C_4$Alkylthio is likewise linear or branched and has e.g. the above-mentioned meanings up to the appropriate number of carbon atoms.

Phenyl or benzoyl radicals substituted by halogen, $C_1$-$C_6$alkyl, $C_1$-$C_6$alkylthio or by $C_1$-$C_6$alkoxy are e.g. mono- to penta-substituted, for example mono-, di- or tri-substituted, especially di- or tri-substituted, at the phenyl ring. Preference is given to e.g. 2,4,6-trimethylbenzoyl, 2,6-dichlorobenzoyl, 2,6-dimethylbenzoyl or 2,6-dimethoxybenzoyl.

$C_1$-$C_4$Alkylene and $C_2$-$C_6$alkylene are linear or branched alkylene, for example $C_2$-$C_4$alkylene, e.g. methylene, ethylene, propylene, isopropylene, n-butylene, sec-butylene, isobutylene, tert-butylene, pentylene and hexylene. Preference is given to $C_1$-$C_4$alkylene, e.g. ethylene or butylene,

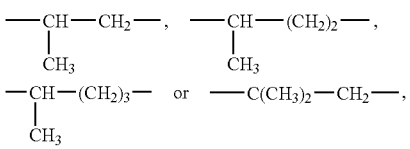

and also methylene and ethylene.

Phenylene-$C_1$-$C_4$alkylene is phenylene that is substituted by $C_1$-$C_4$alkylene in one position of the aromatic ring, while $C_1$-$C_4$alkylene-phenylene-$C_1$-$C_4$alkylene is phenylene that is substituted by $C_1$-$C_4$alkylene in two positions of the phenylene ring. The alkylene radicals are linear or branched and have, for example, the meanings given above up to the appropriate number of carbon atoms. Examples are

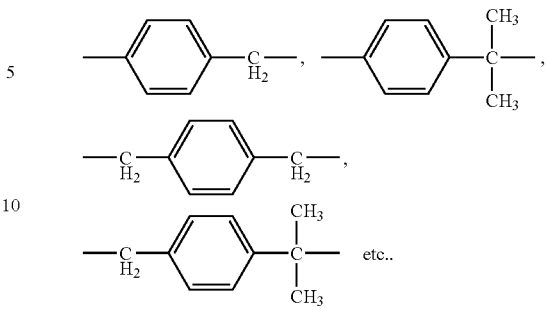

The alkylene groups may, however, also be positioned at other sites on the phenylene ring, e.g. also in the 1,3-position.

Cycloalkylene is e.g. $C_3$-$C_{12}$-, $C_3$-$C_8$-cycloalkylene, for example cyclopropylene, cyclopentylene, cyclohexylene, cyclooctylene, cyclododecylene, especially cyclopentylene and cyclohexylene, preferably cyclohexylene. $C_3$-$C_{12}$cycloalkylene also denotes, however, structural units such as

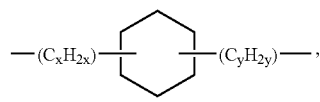

wherein x and y are each independently of the other from 0 to 6 and the sum of $x+y \leq 6$, or

wherein x and y are each independently of the other from 0 to 7 and the sum of $x+y \leq 7$.

$C_2$-$C_{12}$Alkenyl radicals may be mono- or poly-unsaturated and linear or branched and are, for example, $C_2$-$C_8$-, $C_2$-$C_6$- or $C_2$-$C_4$-alkenyl. Examples are allyl, methallyl, 1,1-dimethylallyl, 1-butenyl, 2-butenyl, 1,3-pentadienyl, 1-hexenyl, 1-octenyl, decenyl and dodecenyl, especially allyl.

When $R_7$ and $R_8$ together are $C_2$-$C_6$alkylene, then together with the carbon atom to which they are bonded they form a $C_3$-$C_7$cycloalkyl ring. $C_3$-$C_7$cycloalkyl is, for example, cyclopropyl, cyclopentyl, cyclohexyl, cycloheptyl, especially cyclopentyl or cyclohexyl, preferably cyclohexyl.

$R_cR_bC=CR_a$— is, for example, —CH=$CH_2$ or —C($CH_3$)=$CH_2$, preferably —CH=$CH_2$.

After the application of the photoinitiator, the workpiece can be stored or immediately processed further, there being applied by means of known technology either (preferred) a radiation-curable coating containing ethylenically unsaturated bonds, or a coating that dries/cures in some other way, e.g. a printing ink. This can be effected by means of pouring, immersion, spraying, coating, knife application, roller application or spin-coating.

The unsaturated compounds of the radiation-curable composition may contain one or more ethylenically unsaturated double bonds. They may be lower molecular weight (monomeric) or higher molecular weight (oligomeric). Examples of monomers having a double bond are alkyl and hydroxyalkyl acrylates and methacrylates, e.g. methyl, ethyl, butyl, 2-ethylhexyl and 2-hydroxyethyl acrylate, isobornyl acrylate and methyl and ethyl methacrylate. Also of interest are silicone acrylates. Further examples are acrylonitrile, acrylamide, methacrylamide, N-substituted (meth)acrylamides, vinyl esters, such as vinyl acetate, vinyl ethers, such as isobutyl vinyl ether, styrene, alkyl- and halo-styrenes, N-vinylpyrrolidone, vinyl chloride and vinylidene chloride.

Examples of monomers having more than one double bond are ethylene glycol diacrylate, 1,6-hexanediol diacrylate, propylene glycol diacrylate, dipropylene glycol diacrylate, tripropylene glycol diacrylate, neopentyl glycol diacrylate, hexamethylene glycol diacrylate and bisphenol-A diacrylate, 4,4'-bis(2-acryloyloxyethoxy)diphenylpropane, trimethylolpropane triacrylate, pentaerythritol triacrylate, pentaerythritol tetraacrylate, vinyl acrylate, divinylbenzene, divinyl succinate, diallyl phthalate, triallyl phosphate, triallyl isocyanurate, tris(hydroxyethyl) isocyanurate triacrylate (Sartomer 368; from Cray Valley) and tris(2-acryloylethyl) isocyanurate.

It is also possible in radiation-curable systems to use acrylic esters of alkoxylated polyols, for example glycerol ethoxylate triacrylate, glycerol propoxylate triacrylate, trimethylolpropaneethoxylate triacrylate, trimethylolpropanepropoxylate triacrylate, pentaerythritol ethoxylate tetraacrylate, pentaerythritol propoxylate triacrylate, pentaerythritol propoxylate tetraacrylate, neopentyl glycol ethoxylate diacrylate or neopentyl glycol propoxylate diacrylate. The degree of alkoxylation of the polyols used may vary.

Examples of higher molecular weight (oligomeric) polyunsaturated compounds are acrylated epoxy resins, acrylated or vinyl-ether- or epoxy-group-containing polyesters, polyurethanes and polyethers. Further examples of unsaturated oligomers are unsaturated polyester resins, which are usually produced from maleic acid, phthalic acid and one or more diols and have molecular weights of about from 500 to 3000. In addition it is also possible to use vinyl ether monomers and oligomers, and also maleate-terminated oligomers having polyester, polyurethane, polyether, polyvinyl ether and epoxide main chains. In particular, combinations of vinyl-ether-group-carrying oligomers and polymers, as described in WO 90/01512, are very suitable, but copolymers of monomers functionalised with maleic acid and vinyl ether also come into consideration. Such unsaturated oligomers can also be termed prepolymers.

Especially suitable are, for example, esters of ethylenically unsaturated carboxylic acids and polyols or polyepoxides, and polymers having ethylenically unsaturated groups in the chain or in side groups, e.g. unsaturated polyesters, polyamides and polyurethanes and copolymers thereof, alkyd resins, polybutadiene and butadiene copolymers, polyisoprene and isoprene copolymers, polymers and copolymers having (meth)acrylic groups in side chains, and also mixtures of one or more such polymers.

Examples of unsaturated carboxylic acids are acrylic acid, methacrylic acid, crotonic acid, itaconic acid, cinnamic acid and unsaturated fatty acids such as linolenic acid or oleic acid. Acrylic and methacrylic acid are preferred.

Suitable polyols are aromatic and especially aliphatic and cycloaliphatic polyols. Examples of aromatic polyols are hydroquinone, 4,4'-dihydroxydiphenyl, 2,2-di(4-hydroxyphenyl)propane, and novolaks and resols. Examples of polyepoxides are those based on the said polyols, especially the aromatic polyols and epichlorohydrin. Also suitable as polyols are polymers and copolymers that contain hydroxyl groups in the polymer chain or in side groups, e.g. polyvinyl alcohol and copolymers thereof or polymethacrylic acid hydroxyalkyl esters or copolymers thereof. Further suitable polyols are oligoesters having hydroxyl terminal groups.

Examples of aliphatic and cycloaliphatic polyols include alkylenediols having preferably from 2 to 12 carbon atoms, such as ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol and sorbitol.

The polyols may have been partially or fully esterified by one or by different unsaturated carboxylic acid(s), it being possible for the free hydroxyl groups in partial esters to have been modified, for example etherified, or esterified by other carboxylic acids.

Examples of esters are:
trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tri-pentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4-butanediol diitaconate, sorbitol triacrylate, sorbitol tetraacrylate, pentaerythritol-modified triacrylate, sorbitol tetramethacrylate, sorbitol pentaacrylate, sorbitol hexaacrylate, oligoester acrylates and methacrylates, glycerol di- and tri-acrylate, 1,4-cyclohexane diacrylate, bisacrylates and bismethacrylates of polyethylene glycol having a molecular weight of from 200 to 1500, and mixtures thereof. Also suitable as a component are the amides of identical or different unsaturated carboxylic acids and aromatic, cycloaliphatic and aliphatic polyamines having preferably from 2 to 6, especially from 2 to 4, amino groups. Examples of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, dodecylenediamine, 1,4-diamino-cyclohexane, isophoronediamine, phenylenediamine, bisphenylenediamine, di-β-aminoethyl ether, diethylenetriamine, triethylenetetramine and di(β-aminoethoxy)- and di(β-aminopropoxy)-ethane. Further suitable polyamines are polymers and copolymers which may have additional amino groups in the side chain and oligoamides having amino terminal groups. Examples of such unsaturated amides are: methylene bisacrylamide, 1,6-hexamethylene bisacrylamide, diethylenetriamine trismethacrylamide, bis (methacrylamidopropoxy)ethane, β-methacrylamidoethyl methacrylate and N-[(β-hydroxyethoxy)ethyl]-acrylamide.

Suitable unsaturated polyesters and polyamides are derived, for example, from maleic acid and diols or diamines. The maleic acid may have been partially replaced by other dicarboxylic acids. They may be used together with ethylenically unsaturated comonomers, e.g. styrene. The polyesters and polyamides may also be derived from dicarboxylic acids and ethylenically unsaturated diols or diamines, especially from those having longer chains of e.g. from 6 to 20 carbon atoms. Examples of polyurethanes are those composed of saturated diisocyanates and unsaturated diols or unsaturated diisocyanates and saturated diols.

Polybutadiene and polyisoprene and copolymers thereof are known. Suitable comonomers include, for example, olefins, such as ethylene, propene, butene, hexene, (meth)acrylates, acrylonitrile, styrene and vinyl chloride. Polymers having (meth)acrylate groups in the side chain are likewise known. Examples are reaction products of novolak-based epoxy resins with (meth)acrylic acid; homo- or co-polymers of vinyl alcohol or hydroxyalkyl derivatives thereof that have been esterified with (meth)acrylic acid; and homo- and co-polymers of (meth)acrylates that have been esterified with hydroxyalkyl (meth)acrylates.

In the context of the present application the term (meth) acrylate includes both the acrylate and the methacrylate.

An acrylate or methacrylate compound is especially used as the mono- or poly-ethylenically unsaturated compound.

Very special preference is given to polyunsaturated acrylate compounds, such as have already been mentioned above.

Special preference is given to a process wherein at least one of the ethylenically unsaturated monomers or oligomers of the radiation-curable composition is a mono-, di-, tri- or tetra-functional acrylate or methacrylate.

The composition, in addition to comprising at least one ethylenically unsaturated monomer or oligomer, preferably comprises at least one further photoinitiator or coinitiator for the curing with UV/VIS radiation.

The invention therefore relates also to a process wherein in process step d1) a photopolymerisable composition, comprising at least one ethylenically unsaturated monomer or/and oligomer and at least one photoinitiator and/or coinitiator, is applied to the pretreated substrate and cured by means of UV/VIS radiation.

In the context of the present invention, UV/VIS radiation is to be understood as being electromagnetic radiation in a wavelength range from 150 nm to 700 nm. Preference is given to the range from 250 nm to 500 nm. Suitable lamps are known to the person skilled in the art and are commercially available.

The photosensitivity of the compositions according to process step d1) usually extends from approximately 150 nm to approximately 600 nm (UV field). A large number of the most varied kinds of light source may be used. Both point sources and planiform radiators (lamp arrays) are suitable. Examples are: carbon arc lamps, xenon arc lamps, medium-pressure, super-high-pressure, high-pressure and low-pressure mercury radiators doped, where appropriate, with metal halides (metal halide lamps), microwave-excited metal vapour lamps, excimer lamps, superactinic fluorescent tubes, fluorescent lamps, argon incandescent lamps, flash lamps, photographic floodlight lamps, light-emitting diodes (LED), electron beams and X-rays. The distance between the lamp and the substrate to be irradiated may vary according to the intended use and the type and strength of the lamp and may be, for example, from 2 cm to 150 cm. Also suitable are laser light sources, for example excimer lasers, such as Krypton-F lasers for irradiation at 248 nm. Lasers in the visible range may also be used. This method may be used to produce printed circuits in the electronics industry, lithographic offset printing plates or relief printing plates and also photographic image-recording materials.

The above description of suitable radiation sources relates both to irradiation step c) (fixing of the photoinitiator) in the process according to the invention and the procedure of process step d) (curing of the photocurable composition).

The curing of the composition applied in process step d1) or d2) may, in addition, likewise be carried out with daylight or with light sources equivalent to daylight.

Advantageously the dose of radiation used in process step c) is e.g. from 1 to 1000 mJ/cm$^2$, such as 1-800 mJ/cm$^2$, or, for example, 1-500 mJ/cm$^2$, e.g. from 5 to 300 mJ/cm$^2$, preferably from 10 to 200 mJ/cm$^2$.

As photoinitiator in the radiation-curable compositions according to process step d1) it is possible to use compounds of formula I or Ia or any initiators and initiator systems known from the prior art.

In those compositions preference is given to the use of photoinitiators without unsaturated groups.

Typical examples are mentioned below, which can be used either singly or in admixture with one another. For example, benzophenones, benzophenone derivatives, acetophenone, acetophenone derivatives, for example α-hydroxycycloalkylphenyl ketone or 2-hydroxy-2-methyl-1-phenyl-propanone, dial koxyacetophenones, α-hydroxy- or α-amino-acetophenones, for example (4-methylthiobenzoyl)-1-methyl-1-morpholino-ethane, (4-morpholino-benzoyl)-1-benzyl-1-dimethylamino-propane, (4-methylthiobenzoyl)-1-methyl-1-morpholino-ethane, (4-morpholino-benzoyl)-1-(4-methylbenzyl)-1-dimethylamino-propane, 4-aroyl-1,3-dioxolanes, benzoin alkyl ethers and benzil ketals, e.g. benzil dimethyl ketal, phenylglyoxalates and derivatives thereof, dimeric phenylglyoxalates, monoacylphosphine oxides, for example (2,4,6-trimethylbenzoyl)-phenyl-phosphine oxide, bisacylphosphine oxides, for example bis(2,6-dimethoxybenzoyl)-(2,4,4-trimethyl-pent-1-yl)phosphine oxide, bis(2,4,6-trimethylbenzoyl)-phenyl-phosphine oxide or bis(2,4,6-trimethylbenzoyl)-(2,4-dipentyloxyphenyl)phosphine oxide, trisacylphosphine oxides, ferrocenium compounds or titanocenes, for example dicyclopentadienyl-bis(2,6-difluoro-3-pyrrolo-phenyl)-titanium and borate salts.

As coinitiators there come into consideration, for example, sensitisers which shift or broaden the spectral sensitivity and thus bring about an acceleration of the photopolymerisation. They are especially aromatic carbonyl compounds, for example benzophenone, thioxanthone, especially isopropyl thioxanthone, anthraquinone and 3-acylcoumarin derivatives, terphenyls, styryl ketones, and also 3-(aroylmethylene)-thiazolines, camphor quinone, and also eosine, rhodamine and erythrosine dyes.

Amines, for example, can also be regarded as photosensitisers when the photoinitiator layer grafted on according to the invention consists of a benzophenone or benzophenone derivative.

Further examples of photosensitisers are

1. Thioxanthones

Thioxanthone, 2-isopropylthioxanthone, 2-chlorothioxanthone, 2-dodecylthioxanthone, 2,4-diethylthioxanthone, 2,4-dimethylthioxanthone, 1-methoxycarbonylthioxanthone, 2-ethoxycarbonylthioxanthone, 3-(2-methoxyethoxycarbonyl)-thioxanthone, 4-butoxycarbonylthioxanthone, 3-butoxycarbonyl-7-methylthioxanthone, 1-cyano-3-chlorothioxanthone, 1-ethoxycarbonyl-3-chlorothioxanthone, 1-ethoxycarbonyl-3-ethoxythioxanthone, 1-ethoxycarbonyl-3-aminothioxanthone, 1-ethoxycarbonyl-3-phenylsulfurylthioxanthone, 3,4-di[2-(2-methoxyethoxy) ethoxycarbonyl]thioxanthone, 1-ethoxycarbonyl-3-(1-methyl-1-morpholinoethyl)-thioxanthone, 2-methyl-6-dimethoxymethyl-thioxanthone, 2-methyl-6-(1,1-dimethoxybenzyl)-thioxanthone, 2-morpholinomethylthioxanthone, 2-methyl-6-morpholinomethylthioxanthone, N-allylthioxanthone-3,4-dicarboximide, N-octylthioxanthone-3,4-dicarboximide, N-(1,1,3,3-tetramethylbutyl)-thioxanthone-3,4-dicarboximide, 1-phenoxythioxanthone, 6-ethoxycarbonyl-2-methoxythioxanthone, 6-ethoxycarbonyl-2-methylthioxanthone, thioxanthone-2-polyethylene glycol ester, 2-hydroxy-3-(3,4-dimethyl-9-oxo-9H-thioxanthon-2-yloxy)-N,N,N-trimethyl-1-propanaminium chloride;

2. Benzophenones

Benzophenone, 4-phenylbenzophenone, 4-methoxybenzophenone, 4,4'-dimethoxybenzophenone, 4,4'-dimethylbenzophenone, 4,4'-dichlorobenzophenone, 4,4'-dimethylaminobenzophenone, 4,4'-diethylaminobenzophenone, 4-methylbenzophenone, 2,4,6-trimethylbenzophenone, 4-(4-methylthiophenyl)-benzophenone, 3,3'-dimethyl-4-methoxybenzophenone, methyl-2-benzoyl benzoate, 4-(2-hydroxyethylthio)-benzophenone, 4-(4-tolylthio)-benzophenone, 4-benzoyl-N,N,N-trimethylbenzenemethanaminium chloride, 2-hydroxy-3-(4-benzoylphenoxy)-N,N,N-trimethyl-1-propanaminium chloride monohydrate, 4-(13-acryloyl-1,4,7,10,13-pentaoxatridecyl)-benzophenone, 4-benzoyl-N,N-dimethyl-N-[2-(1-oxo-2-propenyl)oxy]ethyl-benzenemethanaminium chloride;

3. 3-Acylcoumarins

3-Benzoylcoumarin, 3-benzoyl-7-methoxycoumarin, 3-benzoyl-5,7-di(propoxy)coumarin, 3-benzoyl-6,8-dichlorocoumarin, 3-benzoyl-6-chlorocoumarin, 3,3'-carbonyl-bis[5,7-di(propoxy)coumarin], 3,3'-carbonyl-bis(7-methoxycoumarin), 3,3'-carbonyl-bis(7-diethylaminocoumarin), 3-isobutyroylcoumarin, 3-benzoyl-5,7-dimethoxycoumarin, 3-benzoyl-5,7-diethoxycoumarin, 3-benzoyl-5,7-dibutoxycoumarin, 3-benzoyl-5,7-di(methoxyethoxy)-coumarin, 3-benzoyl-5,7-di(allyloxy)coumarin, 3-benzoyl-7-dimethylaminocoumarin, 3-benzoyl-7-diethylaminocoumarin, 3-isobutyroyl-7-dimethylaminocoumarin, 5,7-dimethoxy-3-(1-naphthoyl)-coumarin, 5,7-dimethoxy-3-(1-naphthoyl)-coumarin, 3-benzoylbenzo[f]coumarin, 7-diethylamino-3-thienoylcoumarin, 3-(4-cyanobenzoyl)-5,7-dimethoxycoumarin;

4. 3-(Aroylmethylene)-thiazolines

3-Methyl-2-benzoylmethylene-β-naphthothiazoline, 3-methyl-2-benzoylmethylene-benzothiazoline, 3-ethyl-2-propionylmethylene-β-naphthothiazoline;

5. Other Carbonyl Compounds

Acetophenone, 3-methoxyacetophenone, 4-phenylacetophenone, benzil, 2-acetylnaphthalene, 2-naphthaldehyde, 9,10-anthraquinone, 9-fluorenone, dibenzosuberone, xanthone, 2,5-bis(4-diethylaminobenzylidene)cyclopentanone, α-(para-dimethylaminobenzylidene)-ketones, such as 2-(4-dimethylamino-benzylidene)-indan-1-one or 3-(4-dimethylaminophenyl)-1-indan-5-yl-propenone, 3-phenylthiophthalimide, N-methyl-3,5-di(ethylthio)phthalimide, N-methyl-3,5-di(ethylthio)phthalimide.

In addition to those additives it is also possible for the radiation-curable composition to comprise further additives, especially light stabilisers. The nature and amount of such additional additives is governed by the intended use of the coating in question and will be familiar to the person skilled in the art.

The compositions may also be pigmented when a suitable photoinitiator is chosen, it being possible for coloured pigments as well as white pigments to be used.

The compositions can be applied in layer thicknesses of from about 0.1 µm to about 1000 µm, especially about from 1 µm to 100 µm. In the range of low layer thicknesses <50 µm, pigmented compositions e.g. are also referred to as printing inks.

As light stabilisers it is possible to add UV absorbers, e.g. those of the hydroxyphenylbenzotriazole, hydroxyphenylbenzophenone, oxalic acid amide or hydroxyphenyl-s-triazine type. Such compounds can be used singly or in the form of mixtures, with or without the use of sterically hindered amines (HALS).

Examples of such UV absorbers and light stabilisers are 1. 2-(2'-Hydroxyphenyl)-benzotriazoles, e.g. 2-(2'-hydroxy-5'-methylphenyl)-benzotriazole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,1,3,3-tetramethylbutyl)-phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)-benzotriazole, 2-(2'-hydroxy-4'-octyloxyphenyl)-benzotriazole, 2-(3',5'-di-tert-amyl-2'-hydroxyphenyl)-benzotriazole, 2-(3',5'-bis(α,α-dimethylbenzyl)-2'-hydroxyphenyl)benzotriazole, mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl)phenyl)-benzotriazole, 2-(3'-tert-butyl-2'-hydroxy-5'-(2-octyloxycarbonylethyl) phenyl)-benzotriazole, 2-(3'-tert-butyl-5'-[2-(2-ethylhexyloxy)carbonylethyl]-2'-hydroxyphenyl)-benzotriazole, 2-(3'-dodecyl-2'-hydroxy-5'-methylphenyl)-benzotriazole and 2-(3'-tert-butyl-2'-hydroxy-5'-(2-isooctyloxycarbonylethyl)-phenyl-benzotriazole, 2,2'-methylene-bis[4-(1,1,3,3-tetramethylbutyl)-6-benzotriazol-2-yl-phenol]; transesterification product of 2-[3'-tert-butyl-5'-(2-methoxycarbonylethyl)-2'-hydroxyphenyl]-benzotriazole with polyethylene glycol 300; [R—CH$_2$CH$_2$—COO(CH$_2$)$_3$]$_2$— wherein R=3'-tert-butyl-4'-hydroxy-5'-2H-benzotriazol-2-yl-phenyl.

2. 2-Hydroxybenzophenones, e.g. the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivative.

3. Esters of unsubstituted or substituted benzoic acids, e.g. 4-tert-butyl-phenyl salicylate, phenyl salicylate, octylphenyl salicylate, dibenzoylresorcinol, bis(4-tert-butylbenzoyl)-resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

4. Acrylates, e.g. α-cyano-β,β-diphenylacrylic acid ethyl ester or isooctyl ester, α-methoxycarbonylcinnamic acid methyl ester, α-cyano-β-methyl-p-methoxycinnamic acid methyl ester or butyl ester, α-methoxycarbonyl-p-methoxycinnamic acid methyl ester, N-(β-methoxycarbonyl-β-cyanovinyl)-2-methyl-indoline.

5. Sterically hindered amines, e.g. bis(2,2,6,6-tetramethylpiperidyl) sebacate, bis(2,2,6,6-tetramethylpiperidyl) succinate, bis(1,2,2,6,6-pentamethylpiperidyl) sebacate, n-butyl-3,5-di-tert-butyl-4-hydroxybenzylmalonic acid bis(1,2,2,6,6-pentamethylpiperidyl) ester, condensation product of 1-hydroxyethyl-2,2,6,6-tetramethyl-4-hydroxypiperidine and succinic acid, condensation product of N,N'-bis (2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl)-1,2,3,4-butanetetraoate, 1,1'-(1,2-ethanediyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetra-methylpiperidyl) succinate, condensation product of N,N'-bis(2,2,6,6-tetramethyl-4-piperidyl)-hexamethylenediamine and 4-morpholino-2,6-dichloro-1,3,5-triazine, condensation product of 2-chloro-4,6-di(4-n-butylamino-2,2,6,6-tetramethylpiperidyl)-1,3,5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)-pyrrolidine-2,5-dione.

6. Oxalic acid diamides, e.g. 4,4'-dioctyloxyoxanilide, 2,2'-diethoxyoxanilide, 2,2'-dioctyloxy-5,5'-di-tert-butyl oxanilide, 2,2'-didodecyloxy-5,5'-di-tert-butyl oxanilide, 2-ethoxy-2'-ethyl oxanilide, N,N'-bis(3-dimethylaminopropyl) oxalamide, 2-ethoxy-5-tert-butyl-2'-ethyl oxanilide and a mixture thereof with 2-ethoxy-2'-ethyl-5,4'-di-tert-butyl oxanilide, mixtures of o- and p-methoxy- and also of o- and p-ethoxy-di-substituted oxanilides.

7. 2-(2-Hydroxyphenyl)-1,3,5-triazines, e.g. 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine, 2-[4-(dodecyloxy/tridecyloxy-2-hydroxypropyl)oxy-2-hydroxy phenyl]-4,6-bis(2,4-dimethylphenyl)-1,3,5-triazine.

In addition to the light stabilisers mentioned above, other stabilisers, for example, such as phosphites or phosphonites, are also suitable.

8. Phosphites and phosphonites, e.g. triphenyl phosphite, diphenylalkyl phosphites, phenyldialkyl phosphites, tris(nonylphenyl)phosphite, trilauryl phosphite, trioctadecyl phosphite, distearyl-pentaerythritol diphosphite, tris(2,4-di-tert-butylphenyl)phosphite, diisodecylpentaerythritol diphosphite, bis(2,4-di-tert-butylphenyl)pentaerythritol diphosphite, bis(2,6-di-tert-butyl-4-methylphenyl)pentaerythritol diphosphite, bis-isodecyloxy-pentaerythritol diphosphite, bis(2,4-di-tert-butyl-6-methylphenyl)pentaerythritol diphosphite, bis(2,4,6-tri-tert-butylphenyl) pentaerythritol diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocine, 6-fluoro-2,4,8,10-tetra-tert-butyl-12-methyl-dibenzo[d,g]-1,3,2-dioxaphosphocine, bis(2,4-di-tert-butyl-6-methylphenyl) methyl phosphite, bis(2,4-di-tert-butyl-6-methylphenyl) ethyl phosphite.

Depending upon the field of use, it is also possible to use additives customary in the art, e.g. antistatics, flow improvers and adhesion promoters.

Compositions applied in process step d1) or d2) are, for example, pigmented or unpigmented surface coatings, inks, ink-jet inks; printing inks, for example screen printing inks, offset printing inks, flexographic printing inks; or overprint varnishes; or primers; or printing plates, offset printing plates; powder coatings, adhesives or repair coatings, repair varnishes or repair putty compositions.

The compositions used in process step d1) need not necessarily comprise a photoinitiator—for example they may be customary electron-beam-curable compositions (without photoinitiator) known to the person skilled in the art.

The substrates pretreated in accordance with the process of the invention can in a further step d1) be coated with customary photocurable compositions and cured with UV/VIS or an electron beam or d2) can be provided with a customary coating, such coatings being dried, for example, in air or thermally. The drying can be effected, for example, also by absorption, for example by penetration into the substrate.

The coating used in process step d2) is preferably a printing ink.

Such printing inks are known to the person skilled in the art, are used widely in the art and are described in the literature.

They are, for example, pigmented printing inks and printing inks coloured with dyes.

A printing ink is, for example, a liquid or paste-form dispersion that comprises colorants (pigments or dyes), binders and also optionally solvents and/or optionally water and additives. In a liquid printing ink, the binder and, if applicable, the additives are generally dissolved in a solvent. Customary viscosities in the Brookfield viscometer are, for example, from 20 to 5000 mpa·s, for example from 20 to 1000 mPa·s, for liquid printing inks. For paste-form printing inks, the values range, for example, from 1 to 100 Pa·s, preferably from 5 to 50 Pa·s. The person skilled in the art will be familiar with the ingredients and compositions of printing inks.

Suitable pigments, like the printing ink formulations customary in the art, are generally known and widely described.

Printing inks comprise pigments advantageously in a concentration of, for example, from 0.01 to 40% by weight, preferably from 1 to 25% by weight, especially from 5 to 10% by weight, based on the total weight of the printing ink.

The printing inks can be used, for example, for intaglio printing, flexographic printing, screen printing, offset printing, lithography or continuous or dropwise ink-jet printing on material pretreated in accordance with the process of the invention using generally known formulations, for example in publishing, packaging or shipping, in logistics, in advertising, in security printing or in the field of office equipment.

Suitable printing inks are both solvent-based printing inks and water-based printing inks. Of interest are, for example, printing inks based on aqueous acrylate. Such inks are to be understood as including polymers or copolymers that are obtained by polymerisation of at least one monomer containing a group

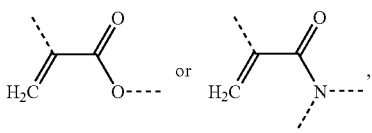

and that are dissolved in water or a water-containing organic solvent. Suitable organic solvents are water-miscible solvents customarily used by the person skilled in the art, for example alcohols, such as methanol, ethanol and isomers of propanol, butanol and pentanol, ethylene glycol and ethers thereof, such as ethylene glycol methyl ether and ethylene glycol ethyl ether, and ketones, such as acetone, ethyl methyl ketone or cyclo, for example isopropanol. Water and alcohols are preferred.

Suitable printing inks comprise, for example, as binder primarily an acrylate polymer or copolymer and the solvent is selected, for example, from the group consisting of water, $C_1$-$C_5$alcohols, ethylene glycol, 2-($C_1$-$C_5$alkoxy)-ethanol, acetone, ethyl methyl ketone and any mixtures thereof.

In addition to the binder, the printing inks may also comprise customary additives known to the person skilled in the art in customary concentrations.

For intaglio or flexographic printing, a printing ink is usually prepared by dilution of a printing ink concentrate and can then be used in accordance with methods known per se.

The printing inks may, for example, also comprise alkyd systems that dry oxidatively.

The printing inks are dried in a known manner customary in the art, optionally with heating of the coating.

A suitable aqueous printing ink composition comprises, for example, a pigment or a combination of pigments, a dispersant and a binder.

Dispersants that come into consideration include, for example, customary dispersants, such as water-soluble dispersants based on one or more arylsulfonic acid/formaldehyde condensation products or on one or more water-soluble oxalkylated phenols, non-ionic dispersants or polymeric acids.

The arylsulfonic acid/formaldehyde condensation products are obtainable, for example, by sulfonation of aromatic compounds, such as naphthalene itself or naphthalene-containing mixtures, and subsequent condensation of the resulting arylsulfonic acids with formaldehyde. Such dispersants are known and are described, for example, in U.S. Pat. No. 5,186,846 und DE-A-197 27 767. Suitable oxalkylated phenols are likewise known and are described, for example, in U.S. Pat. No. 4,218,218 und DE-A-197 27 767. Suitable non-ionic dispersants are, for example, alkylene oxide adducts, polymerisation products of vinylpyrrolidone, vinyl acetate or vinyl alcohol and co- or ter-polymers of vinyl pyrrolidone with vinyl acetate and/or vinyl alcohol.

It is also possible, for example, to use polymeric acids which act both as dispersants and as binders.

Examples of suitable binder components that may be mentioned include acrylate-group-containing, vinyl-group-containing and/or epoxy-group-containing monomers, prepolymers and polymers and mixtures thereof. Further examples are melamine acrylates and silicone acrylates. The acrylate compounds may also be non-ionically modified (e.g. provided with amino groups) or ionically modified (e.g. provided with acid groups or ammonium groups) and used in the form of aqueous dispersions or emulsions (e.g. EP-A-704 469, EP-A-12 339). Furthermore, in order to obtain the desired viscosity the solventless acrylate polymers can be mixed with so-called reactive diluents, for example vinyl-group-containing monomers. Further suitable binder components are epoxy-group-containing compounds.

The printing ink compositions may also comprise as additional component, for example, an agent having a water-retaining action (humectant), e.g. polyhydric alcohols, polyalkylene glycols, which renders the compositions especially suitable for ink-jet printing.

It will be understood that the printing inks may comprise further auxiliaries, such as are customary especially for (aqueous) ink-jet inks and in the printing and coating industries, for example preservatives (such as glutardialdehyde and/or tetramethylolacetyleneurea, anti-oxidants, degassers/defoamers, viscosity regulators, flow improvers, anti-settling agents, gloss improvers, lubricants, adhesion promoters, anti-skin agents, matting agents, emulsifiers, stabilisers, hydrophobic agents, light stabilisers, handle improvers and anti-statics. When such agents are present in the compositions, their total amount is generally $\leqq$1% by weight, based on the weight of the preparation.

Printing inks suitable in process step d2) include, for example, those comprising a dye (with a total content of dyes of e.g. from 1 to 35% by weight, based on the total weight of the ink). Dyes suitable for colouring such printing inks are known to the person skilled in the art and are widely available commercially, e.g. from Ciba Spezialitätenchemie AG, Basel.

Such printing inks may comprise organic solvents, e.g. water-miscible organic solvents, for example $C_1$-$C_4$alcohols, amides, ketones or ketone alcohols, ethers, nitrogen-containing heterocyclic compounds, polyalkylene glycols, $C_2$-$C_6$alkylene glycols and thioglycols, further polyols, e.g. glycerol and $C_1$-$C_4$alkyl ethers of polyhydric alcohols, usually in an amount of from 2 to 30% by weight, based on the total weight of the printing ink.

The printing inks may also, for example, comprise solubilisers, e.g. ε-caprolactam.

The printing inks may, inter alia for the purpose of adjusting the viscosity, comprise thickeners of natural or synthetic origin. Examples of thickeners include commercially available alginate thickeners, starch ethers or locust bean flour ethers. The printing inks comprise such thickeners e.g. in an amount of from 0.01 to 2% by weight, based on the total weight of the printing ink.

It is also possible for the printing inks to comprise buffer substances, for example borax, borate, phosphate, polyphosphate or citrate, in amounts of e.g. from 0.1 to 3% by weight, in order to establish a pH value of e.g. from 4 to 9, especially from 5 to 8.5.

As further additives, such printing inks may comprise surfactants or humectants. Surfactants that come into consideration include commercially available anionic and non-ionic surfactants. Humectants that come into consideration include, for example, urea or a mixture of sodium lactate (advantageously in the form of a 50 to 60% aqueous solution) and glycerol and/or propylene glycol in amounts of e.g. from 0.1 to 30% by weight, especially from 2 to 30% by weight, in the printing inks.

Furthermore, the printing inks may also comprise customary additives, for example foam-reducing agents or especially substances that inhibit the growth of fungi and/or bacteria. Such additives are usually used in amounts of from 0.01 to 1% by weight, based on the total weight of the printing ink.

The printing inks may also be prepared in customary manner by mixing the individual components together, for example in the desired amount of water.

As already mentioned, depending upon the nature of the use, it may be necessary for e.g. the viscosity or other physical properties of the printing ink, especially those properties which influence the affinity of the printing ink for the substrate in question, to be adapted accordingly.

The printing inks are also suitable, for example, for use in recording systems of the kind in which a printing ink is expressed from a small opening in the form of droplets which are directed towards a substrate on which an image is formed. Suitable substrates are, for example, textile fibre materials, paper, plastics or aluminium foils pretreated by the process according to the invention. Suitable recording systems are e.g. commercially available ink-jet printers.

Preference is given to printing processes in which aqueous printing inks are used.

The process according to the invention can be carried out within a wide pressure range, the discharge characteristics shifting as the pressure increases from a pure low-temperature plasma towards a corona discharge and finally changing into a pure corona discharge at an atmospheric pressure of about 1000-1100 mbar.

The process is preferably carried out at a process pressure of from $10^{-6}$ mbar up to atmospheric pressure (1013 mbar), especially in the range of from $10^{-4}$ to $10^{-2}$ mbar as a plasma process and at atmospheric pressure as a corona process. The flame treatment is usually carried out at atmospheric pressure.

The process is preferably carried out using as the plasma gas an inert gas or a mixture of an inert gas with a reactive gas.

When a corona discharge is used, air, $CO_2$ and/or nitrogen are preferably used as the gas. It is especially preferred to use air, $H_2$, $CO_2$, He, Ar, Kr, Xe, $N_2$, $O_2$ or $H_2O$ singly or in the form of a mixture.

The photoinitiator layer deposited preferably has a thickness ranging from e.g. a mono-molecular layer up to 500 nm, especially from 5 nm to 200 nm.

The plasma treatment of the inorganic or organic substrate a) preferably takes place for from 1 ms to 300 s, especially from 10 ms to 200 s.

In principle, it is advantageous to apply the photoinitiator as quickly as possible after the plasma-, corona- or flame-pretreatment, but for many purposes it may also be acceptable to carry out reaction step b) after a time delay. It is preferable, however, to carry out process step b) immediately after process step a) or within 24 hours after process step a).

Of interest is a process wherein process step c) is carried out immediately after process step b) or within 24 hours after process step b).

The pretreated and photoinitiator-coated substrate can be subjected to process step d) immediately after the coating and drying in accordance with process steps a), b) and c) or it can be stored in the pretreated form.

The photoinitiator, or where applicable the mixture of a plurality of photoinitiators and/or coinitiators, is applied to the corona-, plasma- or flame-pretreated substrate, for example, in pure form, that is to say without further additives, or in combination with a monomer or oligomer, or dissolved in a solvent. The initiator, or the initiator mixture, can also e.g. be in molten form. The initiator, or the initiator mixture, can also, for example, be dispersed, suspended or emulsified in water, a dispersant being added as necessary. Of course, it is also possible to use any mixture of the above-mentioned components, photoinitiator, monomer, oligomer, solvent, water.

Suitable dispersants, e.g. any surface-active compounds, preferably anionic and non-ionic surfactants, and also polymeric dispersants, are usually known to the person skilled in the art and are described, for example, in U.S. Pat. Nos. 4,965,294 and 5,168,087.

Suitable solvents are in principle any substances in which the photoinitiator, or the photoinitiators, can be converted into a state suitable for application, whether in the form of a solution or in the form of a suspension or emulsion. Suitable solvents are, for example, alcohols, such as ethanol, propanol, isopropanol, butanol, ethylene glycol etc., ketones, such as acetone, methyl ethyl ketone, acetonitrile, aromatic hydrocarbons, such as toluene and xylene, esters and aldehydes, such as ethyl acetate, ethyl formate, aliphatic hydrocarbons, e.g. petroleum ether, pentane, hexane, cyclohexane, halogenated hydrocarbons, such as dichloromethane, choroform, or alternatively oils, natural oils, castor oil, vegetable oil etc., and also synthetic oils. This description is on no account exhaustive and is given merely by way of example.

Alcohols, water and esters are preferred.

Suitable monomers and oligomers are, for example, those described above in connection with the photocurable composition.

The invention therefore relates also to a process wherein the photoinitiators or mixtures thereof with monomers or oligomers are used in combination with one or more liquids (such as solvents or water) in the form of solutions, suspensions and emulsions.

Also of interest is a process wherein the photoinitiator used in process step b) or the mixture of photoinitiators is used in molten form.

After the plasma-, corona- or flame-pretreatment, it is therefore possible in process step b) to apply to the pretreated substrate, for example, 0.1-15%, e.g. 0.1-5%, of a photoinitiator having an unsaturated group or, for example, 0.1-15%, e.g. 0.1-5%, of a photoinitiator, e.g. one without an unsaturated group, and e.g. 0.5-10% of a monomer, such as an acrylate, methacrylate, vinyl ether etc.

The application of the photoinitiators, or mixtures thereof with one another or with monomers or oligomers, in the form of melts, solutions, dispersions, suspensions or emulsions, can be carried out in various ways. Application can be effected by immersion, spraying, coating, brush application, knife application, roller application, printing, spin-coating and pouring. In the case of mixtures of photoinitiators with one another and with coinitiators and sensitisers, all possible mixing ratios can be used. When only one photoinitiator or photoinitiator mixture is to be applied to the pretreated substrate, the concentration of those initiators is, of course, 100%.

When the photoinitiators are applied in the form of mixtures with monomers or/and solvents or/and water in the form of liquids, solutions, emulsions or suspensions, they are used, for example, in concentrations of from 0.01 to 99.9%, or 0.01-80%, e.g. 0.1-50%, or 10-90%, based on the solution being applied. The liquids comprising the photoinitiator may, in addition, contain e.g. further substances, such as defoamers, emulsifiers, surfactants, anti-fouling agents, wetting agents and other additives customarily used in the industry, especially the coating and paint industries.

Many possible methods of drying coatings are known and they can all be used in the claimed process. For example, it is possible to use hot gases, IR radiators, microwaves and radio frequency radiators, ovens and heated rollers. Drying can also be effected, for example, by absorption, e.g. penetration into the substrate. This relates especially to the drying in process step c), but applies also to the drying carried out in process step d2). Drying can take place, for example, at temperatures of from 0° C. to 300° C., for example from 20° C. to 200° C.

The irradiation of the coating in order to fix the photoinitiator in process step c) (and also to cure the formulation in process step d1) can be carried out, as already mentioned above, using any sources that emit electromagnetic waves of wavelengths that can be absorbed by the photoinitiators used. Such sources are generally light sources that emit light in the range from 200 nm to 700 nm. It may also be possible to use electron beams. In addition to customary radiators and lamps it is also possible to use lasers and LEDs (Light Emitting Diodes). The whole area of the coating or parts thereof may be irradiated. Partial irradiation is of advantage when only certain regions are to be rendered adherent. Irradiation can also be carried out using electron beams.

The drying and/or irradiation can be carried out under air or under inert gas. Nitrogen gas comes into consideration as inert gas, but other inert gases, such as $CO_2$ or argon, helium etc. or mixtures thereof, can also be used. Suitable systems and apparatus are known to the person skilled in the art and are commercially available.

The invention relates also to apparatus for carrying out the process according to the invention which, in accordance with the process described above, improve the adhesion of such coatings. They include at least one plasma treatment unit, corona treatment unit or flame-treatment unit, at least one application unit, at least one drying unit and at least one irradiation unit.

The invention relates also to the use of photoinitiators and photoinitiator systems in the process according to the invention.

The invention relates also to strongly adherent coatings obtainable in accordance with the process described above.

Such strongly adherent coatings are important not only as protective layers or coverings, which may additionally be pigmented, but also for image-forming coatings, for example in resist and printing plate technology. In the case of image-forming processes, the irradiation can be effected through a mask or by writing using moving laser beams (Laser Direct Imaging—LDI). Such partial irradiation can be followed by a development or washing step in which portions of the applied coating are removed by means of solvents and/or water or mechanically.

When the process according to the invention is used in the production of image-forming coatings (imaging), for example in the production of printing plates or electronic printed circuit boards, the image-forming step can be carried out either in process step c) or in process step d).

In step d), depending upon the coating formulation used, the image-forming step may be a crosslinking reaction or alternatively a reaction in which the solubility of the formulation is altered.

The invention therefore relates also to a process wherein portions of the photoinitiators, or mixtures thereof with monomers and/or oligomers, applied in process step b) that have not been crosslinked after irradiation in process step c) are removed by treatment with a solvent and/or water and/or mechanically, and to a process wherein after irradiation in process step d1) portions of the coating are removed by treatment with a solvent and/or water and/or mechanically.

It is also possible to use image-forming processes either in one of the two process steps c) and d1) or in both steps c) and d1) in succession.

The following Examples further illustrate the invention but it is not intended to limit the invention to the Examples. Here, as in the remainder of the description and in the claims, parts and percentages relate to weight, unless otherwise indicated.

EXAMPLE 1

The plasma treatment is carried out in a plasma reactor at 13.56 MHz and a variable output of from 10 to 100 W. A 150 μm thick LDPE film (LDPE=Low Density Polyethylene) is used as substrate. Such a substrate is exposed to an argon/oxygen plasma (gas flows: argon 10 sccm, oxygen 2.5 sccm) at an output of 20 W for 1 second at room temperature and a pressure of 5 Pa. Air is then admitted and the sample is removed. A 1% ethanolic solution of photoinitiator A having the following structural formula

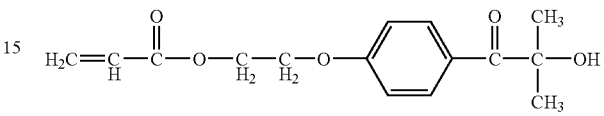

is applied to the treated side of the film using a 4 μm knife (Erichsen). The samples are stored for a short time until the alcohol has evaporated and the samples are dry. They are then irradiated using a UV processor (Fusion Systems) with a microwave-excited mercury lamp and an output of 120 W/cm at a belt speed of 30 m/min.

A radiation-curable epoxy acrylate composition consisting of 89% Ebecryl® 604 (UCB), 10% SR® 344 (Sartomer), 1% Ebecryl® 350 (UCB) and 2% 2-hydroxy-2-methyl-1-phenyl-propanone (Darocur® 1173; Ciba Spezialitätenchemie) is applied using a knife in a layer thickness of about 24 μm to the substrate so precoated. The coated samples are cured in a UV processor (Fusion Systems) with a microwave-excited mercury lamp and an output of 120 W/cm at a belt speed of 15 m/min.

The adhesive strength is determined by crosscutting the coating and tearing off an adhesive tape. In the case of untreated samples, the coating is torn off completely. On samples pretreated with photoinitiator, only minimal fragments become detached at the crosscuts.

EXAMPLE 2

The procedure is as in Example 1, but the ethanolic solution is applied to a grid plate, from which it is printed by means of a rotating rubber roller at a speed of 10 m/min.

Only minimal fragments of the sample pretreated with photoinitiator become detached at the crosscuts; the adhesion is excellent.

EXAMPLE 3

The procedure is as in Example 1, but an aqueous suspension L of the photoinitiator described above is used, which is prepared as follows: 0.2% Tween 40 (polyoxyethylene-20 sorbitan monopalmitate) is dissolved in distilled water. 0.5% of photoinitiator A is added to the resulting solution and the mixture is stirred at 60° C. for one hour. The cloudy liquid is cooled and filtered through a suction-filter (filter paper Macherey-Nagel MN615). Drying is carried out using a hand dryer and is concluded after a few seconds. On the sample pretreated with photoinitiator, only minimal fragments become detached at the crosscuts; the adhesion is excellent.

EXAMPLE 4

The procedure is as in Example 2, but the aqueous suspension L from Example 3 is used. On the sample pretreated with photoinitiator, only minimal fragments become detached at the crosscuts; the adhesion is excellent.

EXAMPLE 5

The LDPE film from Example 1 is corona-treated four times in air using a ceramic electrode (hand-held corona station type CEE 42-0-1 MD, width 330 mm, SOFTAL) at a distance of about 1-2 mm and at an output of 400 W and a treatment speed of 10 cm/s. The aqueous suspension from Example 3 is applied to the treated side of the film using a 4 µm knife (Erichsen). The samples are dried at 60° C. for 15 minutes.

A radiation-curable epoxy acrylate composition consisting of 89% Ebecryl® 604 (UCB), 10% SR® 344 (Sartomer), 1% Ebecryl® 350 (UCB) and 2% 2-hydroxy-2-methyl-1-phenyl-propanone (Darocur® 1173; Ciba Spezialitätenchemie) is applied using a knife in a layer thickness of about 24 µ/m to the substrate so precoated. The coated samples are cured in a UV processor (Fusion Systems) with a microwave-excited mercury lamp and an output of 120 W/cm at a belt speed of 15 m/min. The adhesive strength is determined by crosscutting the coating and tearing off an adhesive tape. In the case of untreated samples, the coating is torn off completely. On samples that have been pretreated with photoinitiator and dried, only minimal fragments become detached at the crosscuts.

EXAMPLE 6

The procedure is as in Example 5 but, after the drying, irradiation is additionally carried out. On the samples that have been pretreated with photoinitiator, dried and irradiated, only minimal fragments become detached at the crosscuts; the adhesion is excellent. No adhesion can be obtained on untreated films.

EXAMPLE 7

The procedure is as in Example 5, but an aqueous solution of 1% of the initiator having the following structural formula is used:

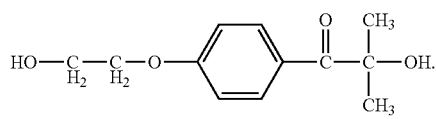

On the sample that has been pretreated with photoinitiator and dried, only minimal fragments become detached at the crosscuts; the adhesion is excellent. No adhesion can be obtained on untreated films.

EXAMPLE 8

In a continuously operating apparatus, an HDPE film (High Density Polyethylene; Hostalen GF7740 $F_2$; 40 µm thick) is treated over a width of 15 cm from roller to roller and at a belt speed of 3 m/min. In a corona unit (Vetaphone Coronaplus type TF-415 having 4 electrodes, 1-2 mm spacing), the film is subjected to treatment at an output of 27 W min/$m^2$. Suspension L from Example 3 is then applied using a roller applicator mechanism (polished steel roller against a rubber roller) and then dried at 60° C. using a drying unit consisting of a hot air blower and an air diffuser 80 cm in length, and the film is wound onto a roll.

A radiation-curable epoxy acrylate composition consisting of 89% Ebecryl® 604 (UCB), 10% SR® 344 (Sartomer), 1% Ebecryl® 350 (UCB) and 2% 2-hydroxy-2-methyl-1-phenyl-propanone (Darocur® 1173; Ciba Spezialitätenchemie) is then applied using a knife in a layer thickness of about 24 µm to portions of the film. The coated samples are cured in a UV processor (Fusion Systems) with a microwave-excited mercury lamp and an output of 120 W/cm at a belt speed of 15 m/min.

The adhesive strength is determined by a folding test and by tearing off an adhesive tape. For that purpose, the coated film is sharply folded several times until cracks appear in the coating. The adhesive tape is then applied and torn off. In the case of untreated samples, the coating is torn off completely. On the samples that have been pretreated with photoinitiator and dried, nothing becomes detached.

EXAMPLE 9

The procedure is as in Example 8 but, in addition, irradiation is carried out after drying and before the treated substrate is wound onto a roll. For that purpose a UV lamp (IST-Metz, M 200 U1) having a nominal output of 120 W/cm is operated at half output.

The adhesive strength is determined by a folding test and by tearing off an adhesive tape. In the case of untreated samples, the coating is torn off completely. On the samples that have been pretreated with photoinitiator, dried and irradiated, nothing becomes detached. The film does not stick to itself on the roll.

EXAMPLE 10

A piece of LDPE film is treated in a manner identical to that described in Example 8 by being adhesively bonded to the HDPE film passing through.

In the case of untreated samples, the coating is torn off completely. On the samples that have been pretreated with photoinitiator and dried, nothing becomes detached.

EXAMPLE 11

In a plasma apparatus as described in Example 1, a PVC film (400 µm thick) is exposed to an argon/oxygen plasma (gas flows: argon 10 sccm, oxygen 2.5 sccm) at an output of 20 W for 10 seconds at room temperature and a pressure of 5 Pa. Air is then admitted and the sample is removed. The aqueous suspension L from Example 3 is applied to the plasma-treated side of the film using a 4 µm knife and dried in a drying cabinet at 60° C. for 15 minutes.

A radiation-curable epoxy acrylate composition consisting of 89% Ebecryl® 604 (UCB), 10% SR® 344 (Sartomer), 1% Ebecryl® 350 (UCB) and 2% 2-hydroxy-2-methyl-1-phenyl-propanone (Darocur® 1173; Ciba Spezialitätenchemie) is applied using a knife in a layer thickness of about 24 µm to the substrate so precoated. The coated samples are cured in a UV processor (Fusion Systems) with a microwave-excited mercury lamp and an output of 120 W/cm at a belt speed of 15 m/min. The adhesive strength is determined by crosscutting the coating and tearing off an adhesive tape. In the case of untreated samples, the coating becomes completely detached. On the samples that have been pretreated with photoinitiator and dried, nothing becomes detached when the adhesive tape is torn off.

EXAMPLE 12

In a plasma apparatus as described in Example 1, a PTFE film (Polytetrafluoroethylene; 250 µm thick) is exposed to an argon/oxygen plasma (gas flows: argon 10 sccm, oxygen 2.5 sccm) at an output of 20 W for 30 seconds at room temperature and a pressure of 5 Pa. Air is then admitted and the sample is removed. The aqueous suspension L from Example 3 is applied to the treated side of the film using a 4 µm knife and dried in a drying cabinet at 60° C. for 15 minutes. The sample is then irradiated using a UV processor (Fusion Systems) with a microwave-excited mercury lamp and an output of 120 W/cm at a belt speed of 30 m/min.

A radiation-curable urethane acrylate composition consisting of 70% Ebecryl® 284 (UCB), 15% N-vinylpyrrolidone (ISP), 15% SR 344 (Sartomer) and 2% 2-hydroxy-2-methyl-1-phenyl-propanone (Darocur® 1173; Ciba Spezialitätenchemie) is applied using a knife in a layer thickness of about 24 µm to the substrate so precoated. The coated samples are cured in three passes through a UV processor (Fusion Systems) with a microwave-excited mercury lamp and an output of 120 W/cm at a belt speed of 15 m/min.

The adhesive strength is determined by tearing off an adhesive tape. In the case of untreated samples, the coating becomes completely detached even on irradiation. On samples that have been pretreated with photoinitiator, dried and irradiated, nothing becomes detached when the adhesive tape is torn off.

EXAMPLE 13

A biaxially oriented polypropylene film (15 µm thick, Trespaphan) is corona-treated four times in air using a ceramic electrode (hand-held corona station type CEE 42-0-1 MD, width 330 mm, SOFTAL) at a distance of about 1-2 mm and at an output of 600 W and a treatment speed of 10 cm/s.

A 1% ethanolic solution of the photoinitiator from Example 1 is applied to the treated side of the film using a 4 µm knife (Erichsen). After drying, the film is irradiated using a UV processor (Fusion Systems) with a microwave-excited mercury lamp and an output of 120 W/cm at a belt speed of 30 m/min.

A radiation-curable urethane acrylate composition consisting of 70% Ebecryl® 284 (UCB), 15% N-vinylpyrrolidone (ISP), 15% SR 344 (Sartomer) and 2% 2-hydroxy-2-methyl-1-phenyl-propanone (Darocur® 1173; Ciba Spezialitätenchemie) is applied using a knife in a layer thickness of about 24 µm to the substrate so precoated. The coated samples are cured in a UV processor (Fusion Systems) with a microwave-excited mercury lamp and an output of 120 W/cm at a belt speed of 15 m/min.

The adhesive strength is determined by a folding test and by tearing off an adhesive tape. In the case of untreated samples, the film is insufficiently wetted by the coating (uncoated regions) and the coating becomes completely detached. On the samples that have been pretreated with photoinitiator, dried and irradiated, nothing becomes detached.

EXAMPLE 14

A biaxially oriented polypropylene film (20 microns thick) is treated by means of a flame-treatment unit, the film being moved at a line speed of 150 m/min, the roller being cooled to 24° C., the distance between flame and film being 3.5 mm and the temperature of the flame (ionoflame temperature) being 745° C.

A 1% ethanolic solution of the photoinitiator from Example 1 is applied to the treated side of the film at a flow rate of 30 m³/h. After drying, the film is irradiated using UV processor (Fusion Systems) with a microwave-excited mercury lamp and an output of 120 W/cm at a belt speed of 30 m/min.

A radiation-curable urethane acrylate composition consisting of 70% Ebecryl® 284 (UCB), 15% N-vinylpyrrolidone (ISP), 15% SR 344 (Sartomer) and 2% 2-hydroxy-2-methyl-1-phenyl-propanone (Darocur® 1173; Ciba Spezialitätenchemie) is applied using a knife in a layer thickness of about 24 µm to the substrate so precoated. The coated samples are cured in a UV processor (Fusion Systems) with a microwave-excited mercury lamp and an output of 120 W/cm at a belt speed of 15 m/min.

The adhesive strength is determined by a folding test and by tearing off an adhesive tape. In the case of untreated samples, the coating becomes completely detached. On the samples that have been pretreated with photoinitiator, dried and irradiated, nothing becomes detached.

EXAMPLE 15

The procedure is as described in Example 14, but photoinitiator A is replaced by the initiator used in Example 7. The adhesive strength is determined by tearing off an adhesive tape. In the case of untreated samples, the coating becomes completely detached. On the samples that have been pretreated with photoinitiator, dried and irradiated, nothing becomes detached when the adhesive tape is torn off.

EXAMPLE 16

A biaxially oriented polypropylene film (15 µm thick, Trespaphan) is corona-treated four times in air using a ceramic electrode (hand-held corona station type CEE 42-0-1 MD, width 330 mm, SOFTAL) at a distance of about 1-2 mm and at an output of 600 W and a treatment speed of 10 cm/s.

A 1% ethanolic solution of the photoinitiator from Example 1 is applied to the treated side of the film using a 4 µm knife (Erichsen). After drying, the film is irradiated using a UV processor (Fusion Systems) with a microwave-excited mercury lamp and an output of 120 W/cm at a belt speed of 30 m/min.

A radiation-curable composition consisting of 67.75% epoxy acrylate oligomer (Craynor®152, Sartomer Company), 30% tetrahydrofurfuryl acrylate (Sartomer® 285, Sartomer Company), 2% 1-hydroxycyclohexylphenylketone (Irgacure® 184; Ciba Spezialitätenchemie) and 0.25% bis(2,4,6-trimethylbenzoyl)-phenylphosphine oxide (Irgacure® 819; Ciba Spezialitätenchemie) is applied to the substrate so precoated. Then a second, untreated, biaxially oriented polypropylene film (15 µm thick, Trespaphan) is applied and the laminate is irradiated in a UV processor (Fusion Systems) with a microwave-excited mercury lamp and an output of 120 W/cm at a belt speed of 15 m/min. The bond cannot be broken again.

EXAMPLE 17

A biaxially oriented polypropylene film (15 µm thick, Trespaphan) is corona-treated four times in air using a ceramics electrode (hand-held corona station type CEE-42-0-1 MD, width 330 mm, SOFTAL) at a distance of about 1-2 mm and at an output of 600 W and a treatment speed of 10 cm/s.

A 1% ethanolic solution of the photoinitiator from Example 1 is applied to the treated side of the film using a 4

μm knife (Erichsen). After drying, the film is irradiated using a UV processor (Fusion Systems) with a microwave-excited mercury lamp and an output of 120 W/cm at a belt speed of 30 m/min.

A radiation-curable composition consisting of 67.75% epoxy acrylate oligomer (Craynor®152, Sartomer Company), 30% tetrahydrofurfuryl acrylate (Sartomer®285, Sartomer Company), 2% 1-hydroxycyclohexylphenylketone (Irgacure® 184; Ciba Spezialitätenchemie) and 0.25% bis(2,4,6-trimethylbenzoyl)-phenylphosphine oxide (Irgacure® 819; Ciba Spezialitätenchemie) is applied to the substrate so precoated.

Then a second, biaxially oriented polypropylene film that has been corona-treated as indicated above is applied and the laminate is irradiated in a UV processor (Fusion Systems) with a microwave-excited mercury lamp and an output of 120 W/cm at a belt speed of 30 m/min. The bond cannot be broken again.

EXAMPLE 18

A biaxially oriented polypropylene film (15 μm thick, Trespaphan) is corona-treated and coated with an ethanolic solution of the photoinitiator from Example 1 as described in example 17.

A radiation-curable composition consisting of 70% epoxy acrylate oligomer (Craynor®152, Sartomer Company) and 30% tetrahydrofurfuryl acrylate (Sartomer®285, Sartomer Company), is applied to the substrate so precoated.

Then a second, biaxially oriented polypropylene film that has been corona-treated as indicated above is applied and the laminate is irradiated in a UV processor (Fusion Systems) with a microwave-excited mercury lamp and an output of 120 W/cm at a belt speed of 30 m/min. The bond cannot be broken again.

What is claimed is:

1. A process for the production of an adherent coating on an inorganic or organic substrate, wherein the inorganic or organic substrate is pretreated by
   a) a low temperature plasma treatment, a corona discharge treatment or a flame treatment is carried out on the inorganic or organic substrate,
   b) one or more photoinitiators or mixtures of photoinitiators with monomers or/and oligomers, containing at least one ethylenically unsaturated group, or solutions, suspensions or emulsions of the one or more photoinitiators or mixtures of photoinitiators with monomers or/and oligomers, containing at least one ethylenically unsaturated group, are applied to the inorganic or organic substrate,
   c) the substances applied to the inorganic or organic substrate in step b) are dried and irradiated with UV/VIS radiation or electron beam radiation after which pretreatment either
   d1) the substrate so precoated with photoinitiator is coated with a composition comprising at least one ethylenically unsaturated monomer or oligomer, and the coating is cured by means of UV/VIS radiation or an electron beam; or
   d2) the substrate so precoated with photoinitiator is coated with a printing ink and dried
   wherein steps a, b and c are performed consecutively.

2. A process according to claim 1, wherein the photoinitiator is a compound or combination of compounds selected from the group consisting of benzoins, benzil ketals, acetophenones, hydroxyalkylphenones, aminoalkylphenones, acylphosphine oxides, acylphosphine sulfides, acyloxyiminoketones, peroxy compounds, halogenated acetophenones, phenylglyoxylates, dimeric phenylglyoxalates, benzophenones, oximes and oxime esters, thioxanthones, thiazolines, ferrocenes, coumarins, dinitrile compounds, titanocenes, sulfonium salts, iodonium salts, diazonium salts, onium salts, borates, triazines, bisimidazoles, polysilanes and dyes, and, optionally, in addition to said compound or combination of compounds corresponding coinitiators and/or sensitisers.

3. A process according to claim 1, wherein the photoinitiator is a compound of formula I or Ia (RG)-A-(IN)    (I), (IN)-A-(RG')-A-(IN)    (Ia), wherein
(IN) is a photoinitiator base structure;
A is a spacer group or a single bond;
(RG) is hydrogen or at least one functional ethylenically unsaturated group; and
(RG') is a single bond or a divalent radical that contains at least one functional ethylenically unsaturated group, or is a trivalent radical.

4. A process according to claim 3, wherein in the compound of formula I or Ia (IN) is a photoinitiator base structure of formula (II) or (III)

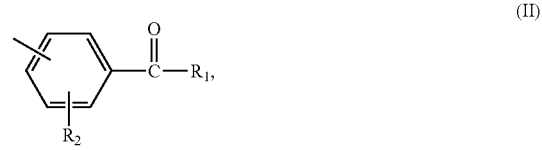

(II)

(III)

$R_1$ is a group (A), (B), (C) or (III)

(A)

(B)

—CR₆R₇R₈

(C)

—C—(OCH₂CH₂)ₙ—OR₁₁;

n is a number from 0 to 6;

$R_2$ is hydrogen, $C_1$-$C_{12}$alkyl, halogen, the group (RG)-A- or, when $R_1$ is a group (A), two radicals $R_2$ in the ortho-position to the carbonyl group may also together be —S— or

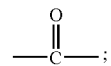

$R_3$ and $R_4$ are each independently of the other $C_1$-$C_6$alkyl, $C_1$-$C_6$alkanoyl, phenyl or benzoyl, the radicals phenyl and benzoyl each being unsubstituted or substituted by halogen, $C_1$-$C_6$alkyl, $C_1$-$C_6$alkylthio or by $C_1$-$C_6$alkoxy;

$R_5$ is hydrogen, halogen, $C_1$-$C_{12}$alkyl or $C_1$-$C_{12}$alkoxy or the group (RG)-A-;

$R_6$ is $OR_9$ or $N(R_9)_2$ or is

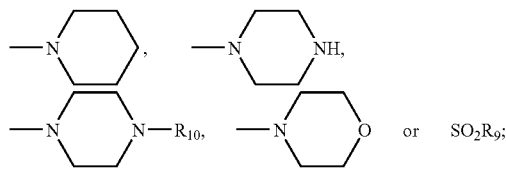

$R_7$ and $R_8$ are each independently of the other hydrogen, $C_1$-$C_{12}$alkyl, $C_2$-$C_{12}$alkenyl, $C_1$-$C_{12}$alkoxy, phenyl or benzyl or $R_7$ and $R_8$ together are $C_2$-$C_6$alkylene;

$R_9$ is hydrogen, $C_1$-$C_6$alkyl or $C_1$-$C_6$alkanoyl;

$R_{10}$ is hydrogen, $C_1$-$C_{12}$alkyl or phenyl;

$R_{11}$ is $C_1$-$C_4$alkyl or

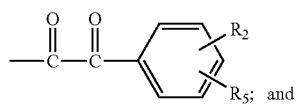

$X_1$ is oxygen or sulfur.

5. A process according to claim 3, wherein in the compound of formula I or Ia (RG) is $R_cR_bC\!\!=\!\!CR_a\!\!-$; (RG') is

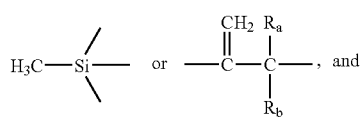

$R_a$, $R_b$ and $R_c$ are each independently of the other hydrogen or $C_1$-$C_6$alkyl.

6. A process according to claim 1, wherein the photoinitiator(s) or mixtures thereof with monomers or oligomers are combined with one or more liquids in the form of solutions, suspensions and emulsions prior to or during application to the inorganic or organic substrate.

7. A process according to claim 1, wherein in process step d1) a photopolymerisable composition, comprising at least one ethylenically unsaturated monomer or/and oligomer and at least one photoinitiator and/or coinitiator, is applied to the pretreated substrate and cured by means of UV/VIS radiation.

8. A process according to claim 1, wherein the plasma treatment is carried out in an inert gas or a mixture of inert gas with reactive gas.

9. A process according to claim 8, wherein the inert gas or a mixture of inert gas with reactive gas is air, $H_2$, $CO_2$, He, Ar, Kr, Xe, $N_2$, $O_2$ or $H_2O$ which gasses are present singly or in the form of a mixture.

10. A process according to claim 1, wherein the photoinitiator layer applied has a thickness ranging from a monomolecular layer up to 500 nm.

11. A process according to claim 1, wherein process step b) is carried out immediately after process step a) or within 24 hours after process step a).

12. A process according to claim 1, wherein the concentration of photoinitiator or photoinitiators in process step b) is from 0.01 to 99.5% by weight based on the weight of solutions, suspensions or emulsions being applied.

13. A process according to claim 1, wherein process step c) is carried out immediately after process step b) or within 24 hours after process step b).

14. A process according to claim 1, wherein drying in process step c) is effected in ovens, with hot gases, heated rollers or IR or microwave radiators or by absorption.

15. A process according to claim 1, wherein irradiation in process step c) is effected with a source that emits electromagnetic waves of wavelengths in the range from 200 nm to 700 nm, or by electron beams.

16. A process according to claim 1, wherein portions of the photoinitiators, or mixtures thereof with monomers and/or oligomers, applied in process step b) that have not been crosslinked after irradiation in process step c) are removed by treatment with a solvent and/or water and/or mechanically.

17. A process according to claim 1, wherein after irradiation in process step d1) portions of the coating are removed by treatment with a solvent and/or water and/or mechanically.

* * * * *